US012699233B2

(12) United States Patent
Hendrix et al.

(10) Patent No.: US 12,699,233 B2
(45) Date of Patent: Aug. 4, 2026

(54) HIGH DENSITY FIBER PANEL ORGANIZATION

(71) Applicant: viaPhoton, Inc., Aurora, IL (US)

(72) Inventors: Walter Mark Hendrix, Dallas, TX (US); Keith Samuel Maranto, Frankfort, IL (US); Mark James Smrha, Chicago, IL (US); Wade James Womack, Allen, TX (US); James Patrick Nolan, Yorkville, IL (US); Eric Russell Klootwyk, Oak Lawn, IL (US); Nathan Eric Benton, Dallas, TX (US)

( * ) Notice: Subject to any disclaimer, the term of this patent is extended or adjusted under 35 U.S.C. 154(b) by 237 days.

(21) Appl. No.: 18/523,874

(22) Filed: Nov. 29, 2023

(65) Prior Publication Data

US 2024/0126026 A1     Apr. 18, 2024

Related U.S. Application Data

(63) Continuation-in-part of application No. 18/380,618, filed on Oct. 16, 2023.

(60) Provisional application No. 63/428,715, filed on Nov. 29, 2022, provisional application No. 63/416,920, filed on Oct. 17, 2022, provisional application No. 63/585,259, filed on Sep. 26, 2023.

(51) Int. Cl.
| | |
|---|---|
| *G02B 6/00* | (2006.01) |
| *G02B 6/38* | (2006.01) |
| *G02B 6/44* | (2006.01) |

(52) U.S. Cl.
CPC ......... *G02B 6/3897* (2013.01); *G02B 6/3885* (2013.01); *G02B 6/4452* (2013.01); *G02B 6/44715* (2023.05)

(58) Field of Classification Search
CPC .. G02B 6/3897; G02B 6/3885; G02B 6/4452; G02B 6/44715; G02B 6/406; G02B 6/44526; G02B 6/3825; G02B 6/3887; G02B 6/00
See application file for complete search history.

(56) References Cited

U.S. PATENT DOCUMENTS

| | | | | |
|---|---|---|---|---|
| 8,731,361 B2 * | 5/2014 | Anderson | .............. | H04Q 1/064 |
| | | | | 385/136 |
| 9,116,324 B2 * | 8/2015 | Cooke | ................ | G02B 6/44526 |
| 2020/0249410 A1 * | 8/2020 | Smrha | ................ | G02B 6/44526 |

* cited by examiner

*Primary Examiner* — Jennifer Doan
(74) *Attorney, Agent, or Firm* — Ferguson Braswell Fraser Kubasta PC

(57) ABSTRACT

An apparatus implements high density fiber panel organization. The apparatus includes a module configured to be secured to a panel of a 1 U rack. The apparatus further includes a front end of the module. The apparatus further includes a height of the front end corresponding to a height of a 1 U rack. The apparatus further includes an aspect ratio of the front end greater than 0.7. The aspect ratio is identified by the height of the front end divided by a width of the front end.

20 Claims, 35 Drawing Sheets

HIGH DENSITY FIBER PANEL ORGANIZATION

CROSS REFERENCE TO RELATED APPLICATIONS

This application claims the benefit of U.S. Provisional Application 63/428,715, filed Nov. 29, 2022, which is incorporated by reference herein. This application is a continuation in part of U.S. patent application Ser. No. 18/380,618, filed Oct. 16, 2023, which is incorporated by reference herein. U.S. patent application Ser. No. 18/380,618 claims the benefit of U.S. Provisional Application 63/416,920, filed Oct. 17, 2022, which is incorporated by reference herein. U.S. patent application Ser. No. 18/380,618 claims the benefit of U.S. Provisional Application 63/585,259, filed Sep. 26, 2023, which is incorporated by reference herein.

BACKGROUND

Telecommunications equipment includes racks and panels used in the management and organization of optical fibers. Optical fibers are thin, flexible strands of glass or plastic that transmit data as light signals. These fibers are widely used for high-speed data transmission, enabling efficient communication networks. Racks and panels serve as the physical framework for these optical fibers, providing support and protection while ensuring a structured layout within telecommunication systems.

Racks serve as a skeletal framework upon which various telecommunication components are mounted. Panels are fixtures designed to be mounted within the rack to accommodate optical fibers to facilitate the flow of data signals through a telecommunications network. The arrangement of fibers within these panels takes care to maintain signal integrity and prevent signal loss for the efficient functioning of telecommunication networks.

A challenge with telecommunications equipment is the low densities of fibers within the panels. The low densities hamper the scalability and efficiency of the systems.

SUMMARY

In general, in one or more aspects, the disclosure relates to an apparatus implementing high density fiber panel organization. The apparatus includes a module configured to be secured to a panel of a 1 U rack. The apparatus further includes a front end of the module. The apparatus further includes a height of the front end corresponding to a height of a 1 U rack. The apparatus further includes an aspect ratio of the front end greater than 0.7. The aspect ratio is identified by the height of the front end divided by a width of the front end.

In general, in one or more aspects, the disclosure relates to a system implementing high density fiber panel organization. The system includes a panel configured to be secured to a 1 U rack. The system further includes a module configured to be secured to the panel. The system further includes a front end of the module. The system further includes a height of the front end corresponding to a height of a 1 U rack. The system further includes an aspect ratio of the front end greater than 0.7. The aspect ratio is identified by the height of the front end divided by a width of the front end.

In general, in one or more aspects, the disclosure relates to a method of high density fiber panel organization. The method includes securing a module to a panel of a 1 U rack.

The module includes a front end of the module. The module further includes a height of the front end corresponding to a height of a 1 U rack. The module further includes an aspect ratio of the front end greater than 0.7. The aspect ratio is identified by the height of the front end divided by a width of the front end. The method further includes securing the panel to the 1 U rack.

Other aspects of one or more embodiments will be apparent from the following description and the appended claims.

BRIEF DESCRIPTION OF DRAWINGS

FIG. 3A, FIG. 3B, FIG. 4A, FIG. 4B, FIG. 4C, FIG. 4D, FIG. 4E, FIG. 4F, FIG. 5, FIG. 6A, FIG. 6B, FIG. 7A, FIG. 7B, FIG. 7C, FIG. 7D, FIG. 7E, FIG. 7F, FIG. 8, FIG. 9A, FIG. 9B, FIG. 10A, FIG. 10B, FIG. 10C, FIG. 10D, FIG. 10E, FIG. 10F, FIG. 11A, FIG. 11B, FIG. 11C, FIG. 12A, FIG. 12B, FIG. 12C, FIG. 12D, FIG. 12E, FIG. 12F, FIG. 13A, FIG. 13B, FIG. 14A, FIG. 14B, FIG. 14C, FIG. 14D, FIG. 14E, FIG. 14F, FIG. 15A, FIG. 15B, FIG. 16A, FIG. 16B, FIG. 16C, FIG. 16D, FIG. 16E, FIG. 16F, FIG. 17A, and FIG. 17B show examples in accordance with one or more embodiments of the disclosure.

Similar elements in the various figures are denoted by similar names and reference numerals. The features and elements described in one figure may extend to similarly named features and elements in different figures.

DETAILED DESCRIPTION

Embodiments of the disclosure address the challenges of low fiber density by providing high density fiber panel organization. High fiber density may be achieved using modules within the panels. The modules include an aspect ratio between the height and width of the module that is close to 1 (e.g., in the range of 1.25 to 0.75). The module includes multiple ports that may each secure multiple fibers.

Figure 1:
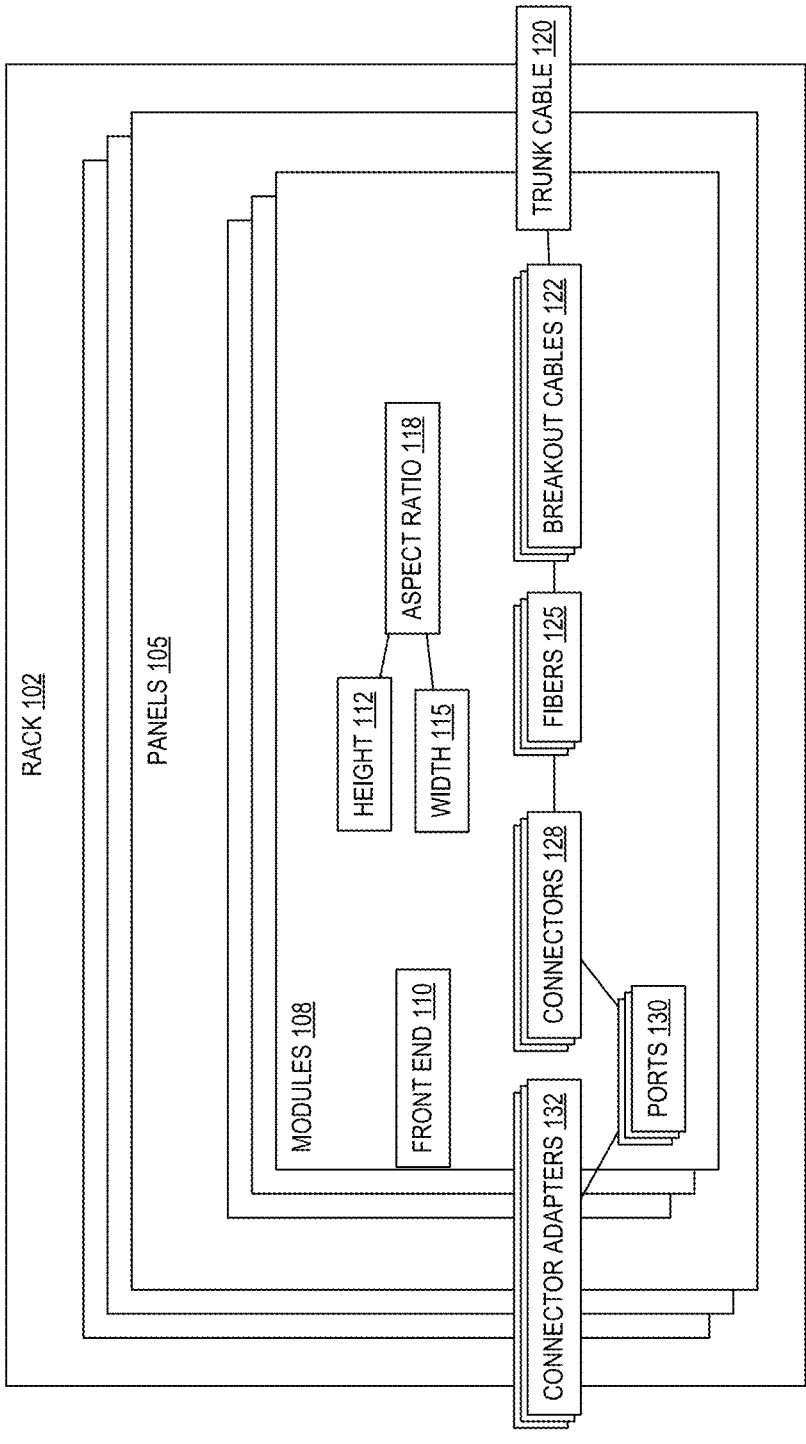
FIG. 1 shows a system, in accordance with one or more embodiments of the disclosure.

Turning to FIG. 1, the rack (102) is a piece of telecommunications equipment that provides a standardized, efficient, and secure solution for the housing and organization of diverse telecommunication devices. The design of the rack (102) provides compatibility, stability, proper ventilation, and streamlined cable management.

The rack may include a sturdy, rectangular frame crafted from durable materials, designed to facilitate the systematic arrangement and secure mounting of various telecommunication devices and components. The rack's outer dimensions measure 19 inches (48.26 cm) in width, a standard measurement adhered to in the telecommunications industry. Other dimensions may be used, e.g., 21 inches, 23 inches, etc.

The rack (102) includes a series of uniformly spaced vertical mounting slots, located on both the front and rear. The slots of the rack (102) serve as attachment points for mounting the panels (105) associated with telecommunication equipment. The standardized spacing between the slots of the rack (102) ensures compatibility with a wide array of telecommunication devices, allowing for seamless integration and easy replacement.

Each mounting slot of the rack (102) may be equipped with fastening mechanisms, enabling the fixation of mounting brackets and panels in a secure and stable manner. The utilization of these mechanisms ensures that the mounted equipment remains firmly in place, even during transportation or in environments with vibrations.

The rack (102) may further be equipped with ventilation openings strategically positioned on the front and rear of the rack (102). The ventilation openings promote adequate airflow within the rack, preventing the accumulation of heat and ensuring optimal operating conditions for the housed telecommunication equipment. Ventilation may contribute to the overall longevity and reliability of the installed devices.

The rack (102) may be designed to facilitate cable management. The rack (102) may incorporate integrated cable routing features, such as cable tie points and channels, which enable the organized routing and bundling of cables connected to the telecommunication equipment. The cable management provided by the rack (102) may enhance the aesthetic design of the rack (102) and simplify maintenance tasks by providing clear pathways for troubleshooting and repairs.

The panels (105) are structured to fit to the rack (102). The panels (105) are fiber interconnection panels structured to support and secure optical fibers and cables. The panels (105) facilitate the organized interconnection of optical components, ensuring reliable and efficient transmission of optical signals. The panels (105) contribute to the operation of telecommunication networks with precision engineering, durability, and integrated cable management features.

The panels (105) are formed with standardized form factors for compatibility with the mounting slots of the rack (102). The panels (105) may be equipped with the modules (108) to secure the fibers (125) using the ports (130), connector adapters (132), connectors (128), etc. The ports (130) are strategically arranged within the modules (108) and the panels (105) to allow for the efficient insertion and termination of optical fiber cables by inserting connectors into the connector adapters (132).

The panels (105) may incorporate integrated cable management features. The cable management features may include cable routing channels, loops, and strain relief mechanisms. Optical fiber cables may be organized and secured using the cable management features to minimize cable stress and prevent signal degradation due to bending or twisting.

A front surface of each of the panels (105) may include labeling options, allowing for clear identification of individual fiber connections. Proper labeling enhances efficient troubleshooting, maintenance, and future expansions by providing reference points for specific optical pathways.

The modules (108) fit to the panels (105) and support the fibers (125). The modules (108) may include features for splicing, cable management, and security. The modules (108) are structured to enhance the organization, protection, and efficient management of optical fiber connections within the telecommunication infrastructure. The modules (108) provide precise and secure optical fiber connections. Each of the modules (108) may include a group of the connector adapters (132) to accommodate various types of optical connectors, such as LC connectors, SC connectors, ST connectors, etc. The modules (108) include a modular design to provide for replacement and customization while maintaining compatibility with diverse optical fiber standards and connector types. Each of the modules (108) includes a front end (110), a height (112), and a width (115).

The front end (110) of one of the modules (108) includes the connector adapters (132). The front end (110) is exposed through the front of one of the panels (105) and through the front of the rack (102).

The height (112) may be used for each of the modules (108) and conforms to the standard dimensions of a 1 U (1 rack unit) rack, measuring 1.75 inches (44.5 mm) in height. Using the height (112) provides for integration and compatibility within the standardized space of a 1 U rack, optimizing vertical rack utilization in telecommunication installations.

The width (115) may be used for each of the modules (108) to fit a group of the modules (108) (10, 12, etc.) within one of the panels (105). The width (115) in combination with the height (112) form the aspect ratio (118).

The aspect ratio (118) may be utilized by each of the modules (108). The aspect ratio (118) is a ratio between the height (112) and the width (115). The aspect ratio (118) may be calculated by dividing the height (112) by the width (115). Embodiments may use an aspect ratio that is near a value of 1, which may be in the inclusive range of 0.75 to 1.25. When the aspect ratio of a module is greater than 1, the height of the module is greater than the width of the module. When the aspect ratio of the module is less than 1, the height of the module is less than the width of the module. Embodiments may use an aspect ratio of 1.11, 1.21, etc. Each of the modules (108) for one of the panels (105) may use the same aspect ratio (118).

The trunk cable (120) is an assembly structured for high-speed data transmission over long distances. The trunk cable (120) includes multiple optical fibers enclosed within a protective outer sheath. The individual fibers within the trunk cable (120) may be arranged, insulated, and grouped to minimize crosstalk and signal interference for reliable data transmission. The outer sheath of the trunk cable (120) may be made from durable materials and shields the internal fibers from environmental factors, including moisture, chemicals, and physical abrasion, to improve the longevity and performance integrity of the fibers within the trunk cable (120). The trunk cable (120) splits to the breakout cables (122).

The breakout cables (122) split off from the trunk cable (120) to distribute optical signals. The breakout cables (122) feature a sturdy yet flexible construction and may house several individual optical fibers within a protective outer sheath. The breakout cables (122) may be insulated and color-coded for easy identification and precise routing. The outer sheath provides resilience against environmental factors to increase the durability of the breakout cables (122). Each of the breakout cables (122) includes one or more of the fibers (125).

The fibers (125) carry data signals for telecommunications equipment. The fibers (125) are slender, hair-like strands composed of high-quality glass or plastic materials, structured to transmit data in the form of light pulses over long distances. The fibers (125) each include a core through which light signals travel and a cladding layer that reflects and guides the light within the core. The fibers (125) may be made from silica glass having high optical clarity and low attenuation for reduced loss of signal strength during transmission. The fibers (125) may be coated with protective layers, such as acrylate or polyimide, to provide mechanical strength and insulation against external factors. Groups of the fibers (125) fit to one of the connectors (128). In one embodiment, the fibers (125) for one of the breakout cables (122) are fitted to one of the connectors (128).

The connectors (128) are components structured to facilitate and secure the interconnection of fibers (125) with other optical fibers. The connectors (128) may be made from durable materials including ceramics and plastics to provide precise alignment for mating different fibers together to allow the transmission of optical signals between the mated fibers. The connectors (128) may include internal structures, such as ferrules and sleeves, which accurately hold and align the ends of the fibers. Types of the connectors (128), such as SC, LC, and ST, are standardized, to provide widespread compatibility and interchangeability between different fiber optic devices. The connectors (128) may include latching mechanisms and keying options to create secure connections. The connectors (128) protect sensitive optical components from dust and damage to improve the integrity of optical links. The connectors (128) expose the fibers (125) through the ports (130).

The ports (130) are interfaces for the connectors (128). Multiple ports (130) may be exposed in one of the connector adapters (132).

The connector adapters (132) are components that facilitate the interconnection between various types of optical connectors. The interconnection may be between a female connector and a male connector. The connector adapters (132) serve as interface points, allowing different connector types, such as LC, SC, or ST, to mate securely and precisely. The connector adapters (132) may be constructed using durable materials like ceramic, metal, plastic, etc. The connector adapters (132) may each include housings and alignment sleeves to provide accurate fiber alignment to minimize or reduce signal loss during transmission. The standardized designs of the connector adapters (132) may adhere to industry norms, enabling compatibility and easy integration into different network setups. The connector adapters (132) may include keying mechanisms to prevent mismatching and facilitate the correct orientation and alignment of the connectors (128).

Figure 2:
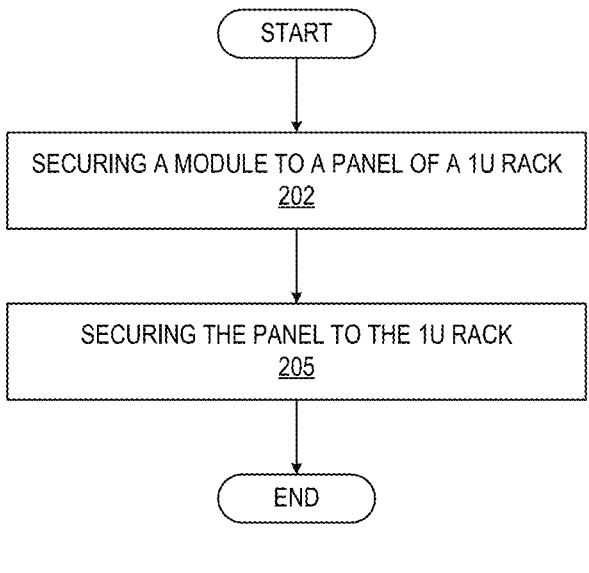
FIG. 2 shows a method in accordance with one or more embodiments of the disclosure.

Turning to FIG. 2, the method disclosed provides high density fiber panel organization. The method (200) may use the modules and other components described in FIG. 1.

At Step 202, the method includes securing a module to a panel of a 1 U rack. In one embodiment, securing the module may include aligning the module with the panel and then inserting the module through a rear end of the panel. In one embodiment, the module and panel may each include fastening elements that work in concert to secure the module to the panel. The fastening elements may include holes, channels, guides, screws, bolts, clips, snaps, latches, etc., to establish a secure placement of the module within the panel.

In one embodiment, the module includes a front end that fits to a front end of the panel. The front end of the module, as well as the module itself, includes a height that corresponds to the height of the 1 U rack (e.g., 1.75 inches or 44.45 millimeters).

In one embodiment, an aspect ratio of the front end may be greater than 0.75. The aspect ratio may be identified by the height of the front end divided by a width of the front end.

In one embodiment, the module may include multiple ports corresponding to multiple connector adapters to which multiple connectors are attached at the front end of the module. A front side of a connector adapter may be open for receiving another connector from an external cable. A rear side of the connector adapter may receive the connector that is attached to a breakout cable from a trunk cable for the module.

In one embodiment, the width of the module is less than the height of the module. With the width less than the height, the aspect ratio may be greater than "1", e.g., "1.11", "1.21", etc. In one embodiment, the aspect ratio may be less than "1" with the width greater than the height. The aspect ratio may be within the range of "1.25" to "0.75" to maintain a substantially square cross-sectional profile to increase or maximize the number of ports exposed by the front end of the module for the perimeter of the front end of the module. The perimeter of the front end of the module may be twice the length times twice the width of the front end of the module.

In one embodiment, at least three rows of connectors are disposed within the front end of the module. In one embodiment, at least six connectors per row may be disposed within the front end of the module. The number of rows and the number of connectors per row may be determined from the dimensions of the connector. In one embodiment, the number of rows may be half the number of ports per row.

In one embodiment, the module is one of multiple modules horizontally placed (e.g., side-by-side) within the panel. The modules may include at least ten modules. In one embodiment, the panel includes twelve modules.

In one embodiment, a height of a connector at the front end within the module is greater than a width of the connector. The height of the connector may be aligned or parallel to the height of the front end of the module such that the connector is vertically aligned with the module. In one embodiment, the height of the connector may be orthogonal to the height of the module such that the connector is horizontally aligned with the module.

In one embodiment, the module secures one of at least thirty six, at least forty eight, at least two hundred eighty eight, and at least five hundred seventy six fibers. The different numbers of fibers may be achieved using different types of connectors. In one embodiment, a module may have a single type of connector used for each port.

In one embodiment, the panel secures one of at least four hundred thirty two fibers with twelve modules, at least four hundred eighty fibers with ten modules, at least three thousand four hundred sixty five fibers with twelve modules, and at least six thousand nine hundred twelve fibers with twelve modules. A panel with ten modules may have each module with a height of 41 millimeters, a width of 37 millimeters, aspect ratio of 1.11. A panel with 12 modules may have each module with a height of 41 millimeters, a width of 34 millimeters, and an aspect ratio of 1.21.

In one embodiment, a port of the module may include a connector that secures up to two, sixteen, twenty four, or thirty two fibers. Different types of connectors may secure different numbers of fibers. In one embodiment, a module may use a single type of connector for each port.

At Step 205, the method includes securing the panel to the 1 U rack. In one embodiment, securing the panel may include aligning the panel with a slot within the rack and then inserting the panel into the slot of the rack. In one embodiment, the panel and rack may each include fastening elements that work in concert to secure the panel to the rack. The fastening elements may include holes, channels, guides, screws, bolts, clips, snaps, latches, etc., to establish a secure placement of the panel within the rack.

Figure 3A:
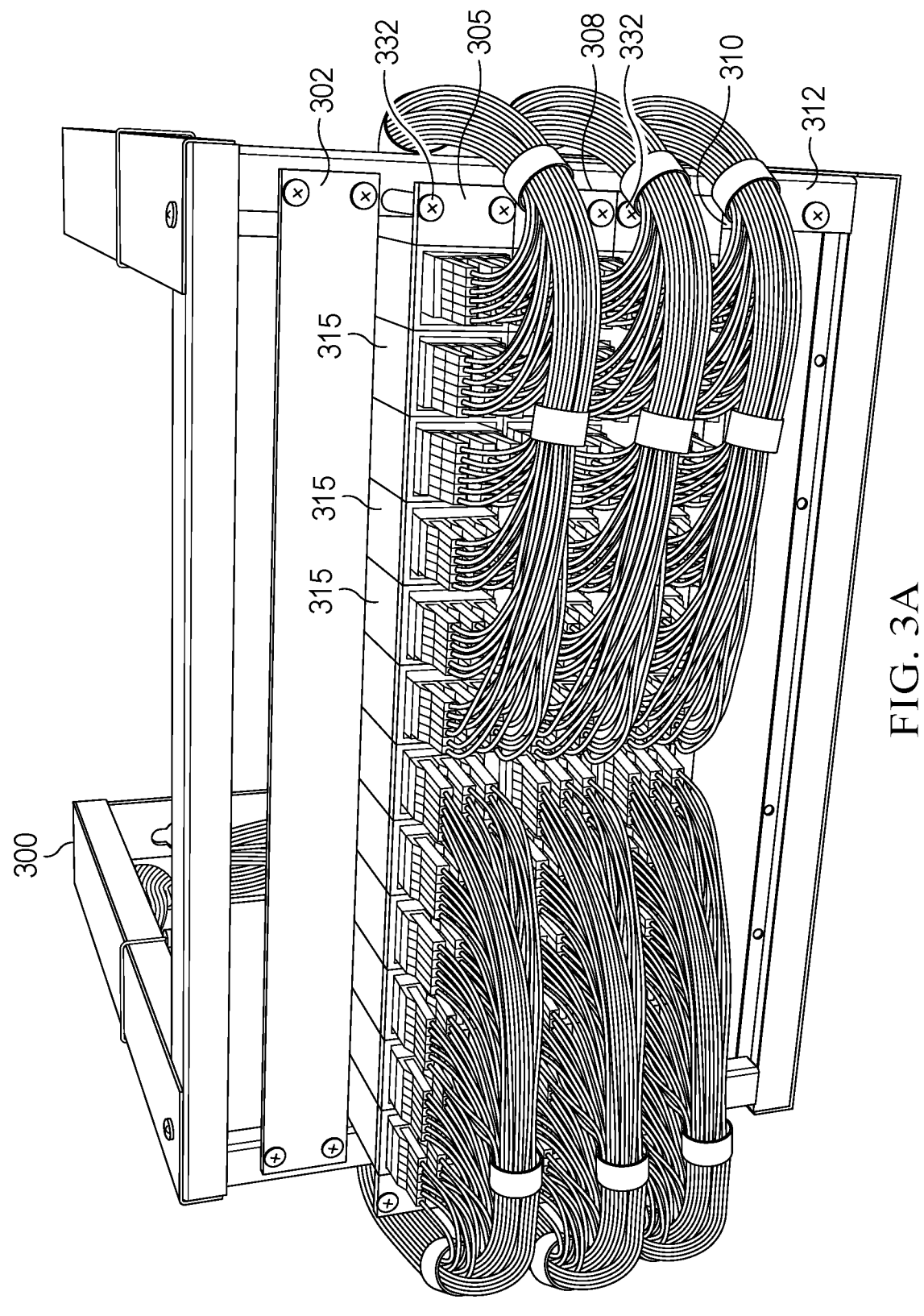

Turning to FIG. 3A, the rack (300) includes the panels (302) through (312) with the modules (315). The modules (315) may use connectors that support two fibers per connector. The rack (300) is a 5 U 19 inch rack with standardized dimensions and five slots for panels. The panels (302) and (312) are blank panels to cover a slot of the rack (300). The panels (305), (308), and (310) each include twelve of the modules (315) to route and connect optical fibers for a communication network. Each of the modules (315) includes connector adapters for three rows of connectors with six connectors per row. The modules (315) may snap into place into the panels (305), (308), and (310).

The panels (305), (308), and (310) are secured to the rack (300) with fastening members including the bolts (332). The ends of the panels (305), (308), and (310), as well as their corresponding modules (315), extend past the front end of the rack (300). With two fibers per port, eighteen ports per module, twelve modules per panel, and five panels per rack, the rack (300) supports four hundred thirty two ("432") fibers per panel and two thousand one hundred sixty ("2,160") fibers per rack.

Figure 3B:
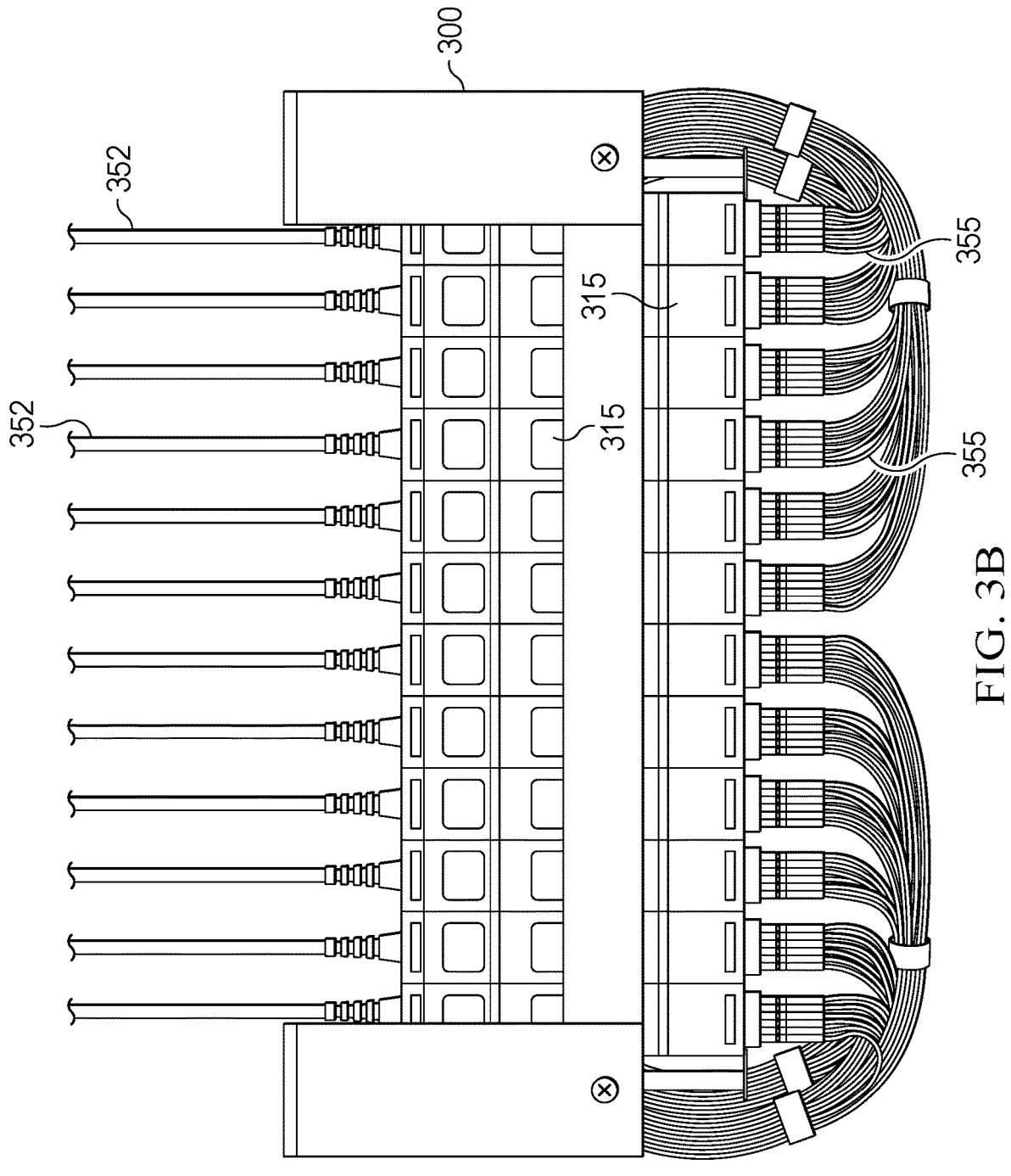

Turning to FIG. 3B, the modules (315) connect the trunk cables (352) at the rear of the rack (300) to the bundles of cables (355) at the front of the rack (300). In one embodiment, the modules (315) extend past the front of the rack (300) within plus or minus ten percent ("10%") of the 1 U rack height for the rack (300). The modules (315) may be inserted through the front of the rack (300) or through the rear of the rack (300).

Figure 4A:
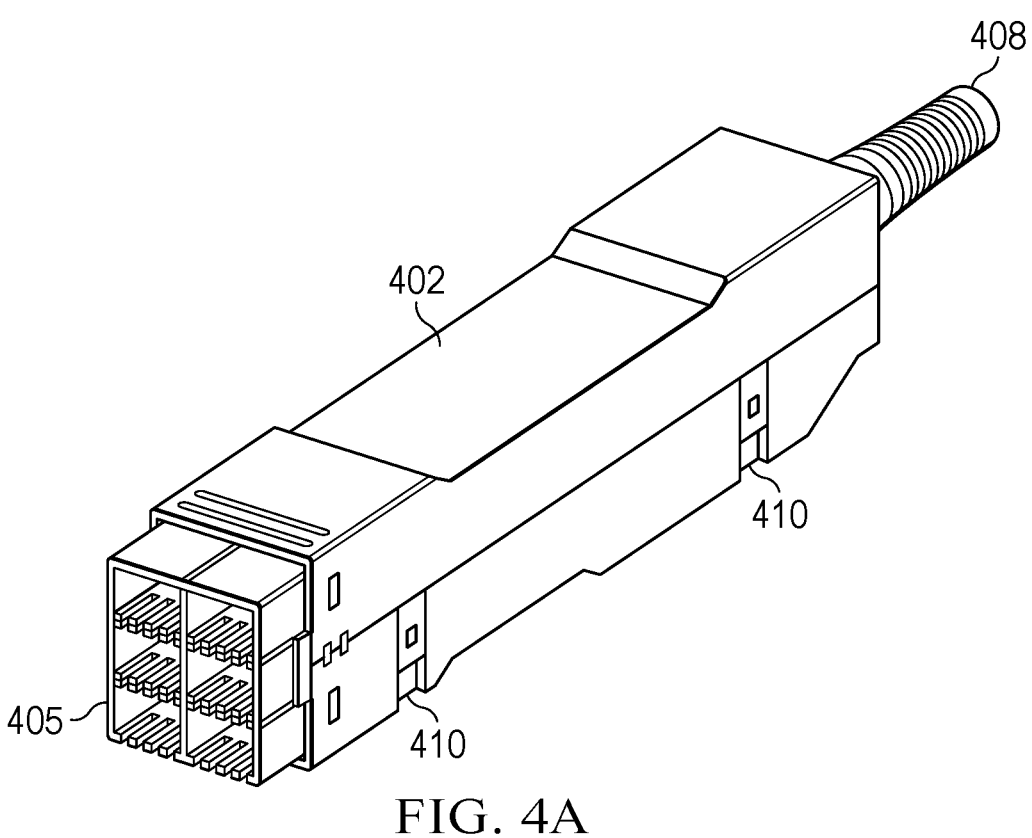

Turning to FIG. 4A, the module (402) includes the connector adapters (405) at a front end of the module (402) with the strain relief (408) at a rear or trunk end of the module (402). The module (402) includes housing with a bottom half that includes the guides (410) to align the bottom half of the module (402) with a top half of the module (402) during assembly. The guides (410) may include integrated fastening features that work in combination with integrated fastening features of the top half of the housing of the module (402) to secure the top half to the bottom half.

Figure 4B:
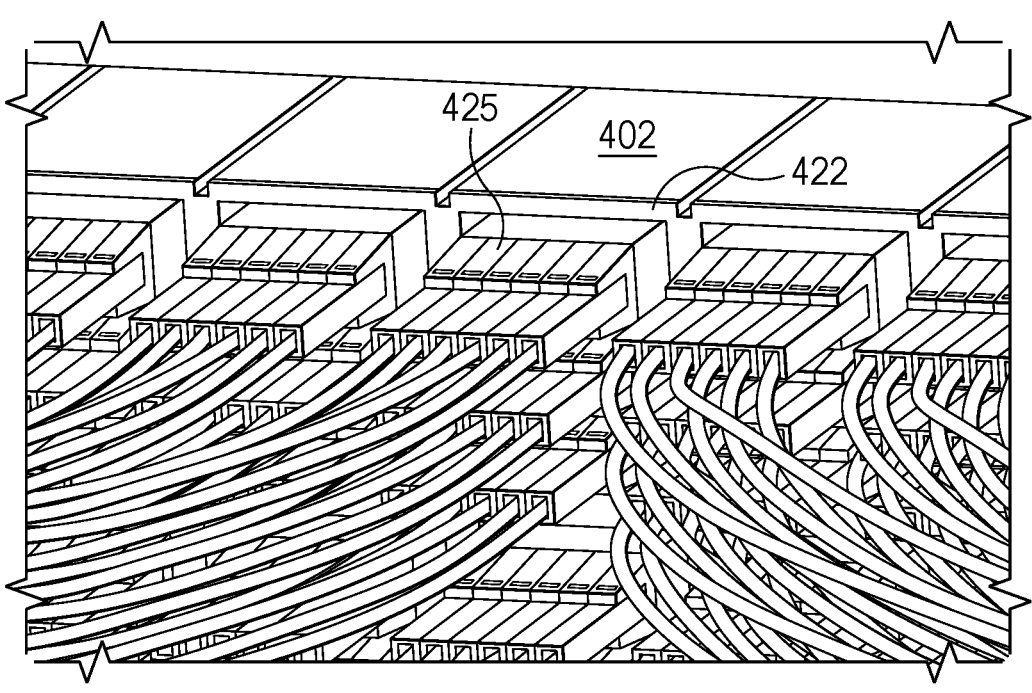

Turning to FIG. 4B, the module (402) is one of multiple modules in the panel (422) in a rack. The module (402) includes connector adapters exposing ports that are filled with eighteen connectors (425) that terminate external cables.

Figure 4C:
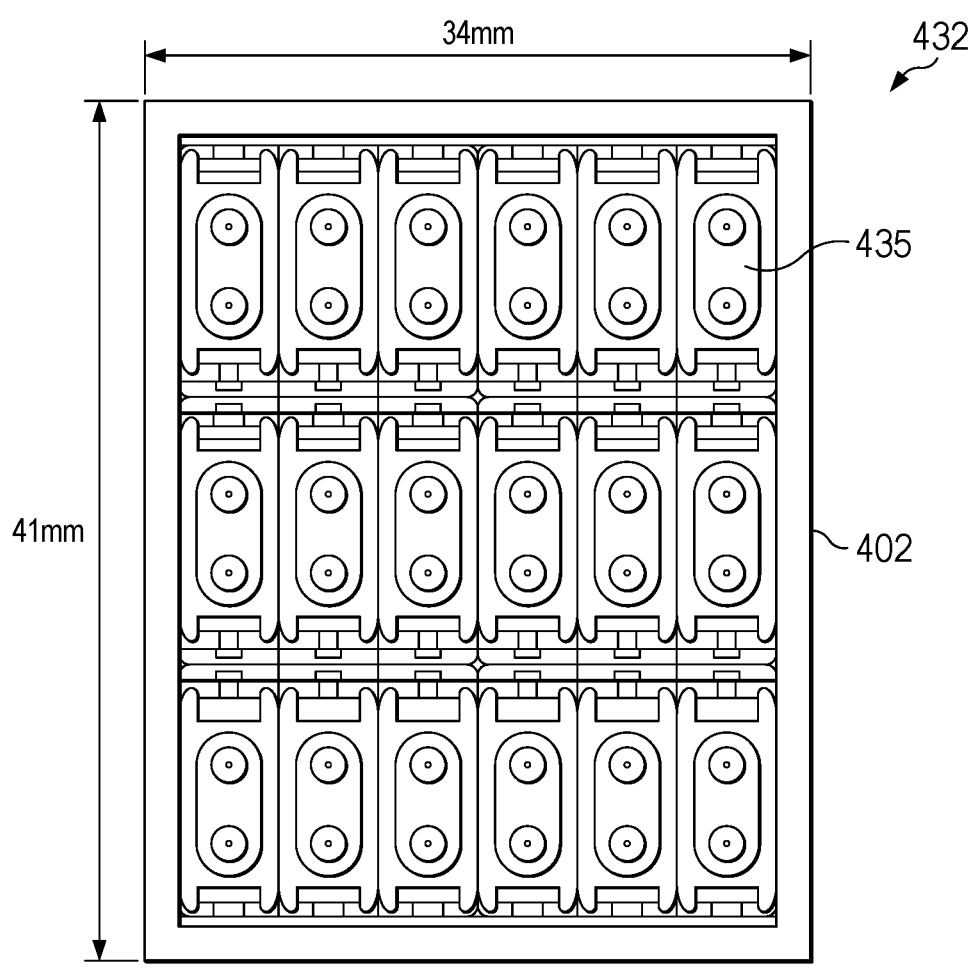

Turning to FIG. 4C, the front end (432) of the module (402) is illustrated. In one embodiment, the module (402) includes eighteen ports (including the port (435)) configured for two fibers per port. In one embodiment, each row may support six ports (with two fibers per port). In one embodiment, the module (405) supports at least thirty six fibers. In one embodiment, the height of the module (402) is 41 millimeters with a tolerance of ±0.03 inches (or ±0.76 millimeters). Different heights of the module may be used, in conjunction with a panel, to fill the 1.75 inch (44.45 millimeter) height available in 1 U of a rack. In one embodiment, the width of the module (402) is 34 millimeters with a tolerance of ±0.03 inches (or ±0.76 millimeters). Different widths of the module may be used. The width of the module (402) may be determined from the width of the connectors multiplied by the number of connectors in a row plus an offset amount for the width of the walls of the housing of the module (402).

The module (402) uses two fibers per port. Different numbers of fibers per port may be used. For example, the module (402) may use sixteen or thirty two fibers per port. Sixteen fibers per port with eighteen ports per module yields two hundred eighty eight fibers per module and three thousand four hundred fifty six fibers per panel that holds twelve of the modules (402) that are 34 millimeters wide. Thirty two fibers per port with eighteen ports per module yields five hundred seventy six fibers per module and six thousand nine hundred twelve fibers per panel that holds twelve of the modules (402) that are 34 millimeters wide.

Figure 4D:
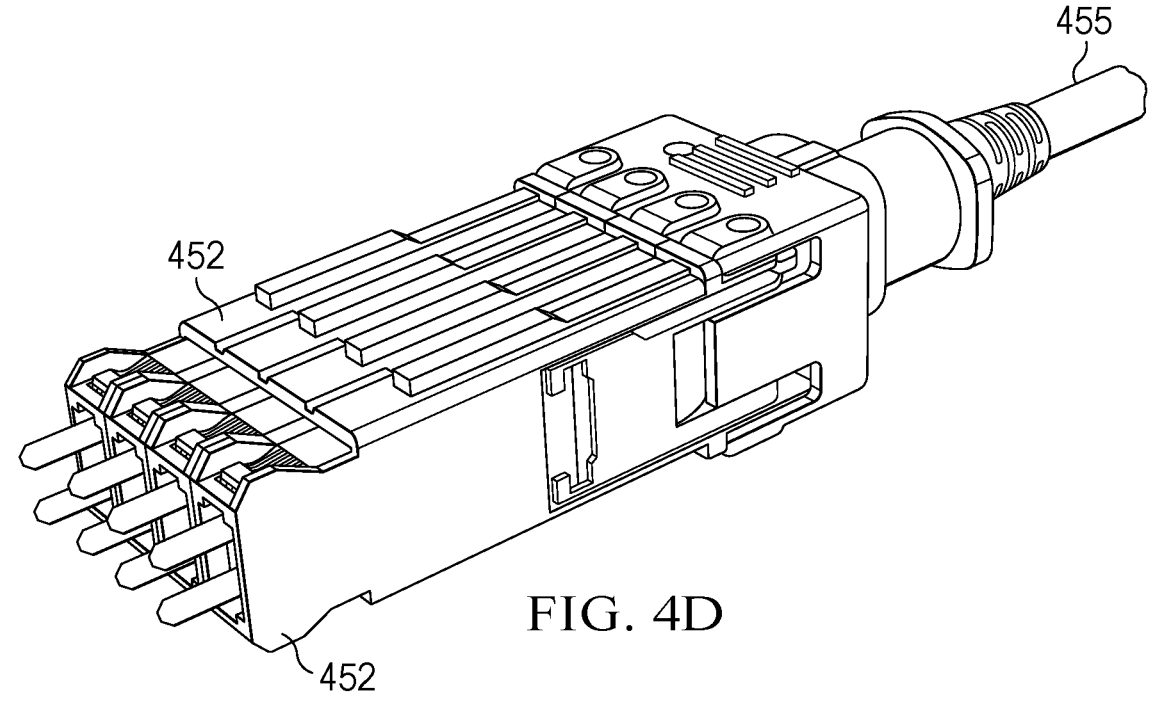

Turning to FIG. 4D, the connectors (452) are shown from a front perspective view. The four connectors (452) are clustered together. The fibers within the connectors (452) are grouped together into the cable (455). The connectors (452) may be fitted to an external side of the connector adapters (405) of FIG. 4A or to an internal side (i.e., within the module (402) of FIG. 4A) of the connector adapters (405) of FIG. 4A.

Figure 4E:
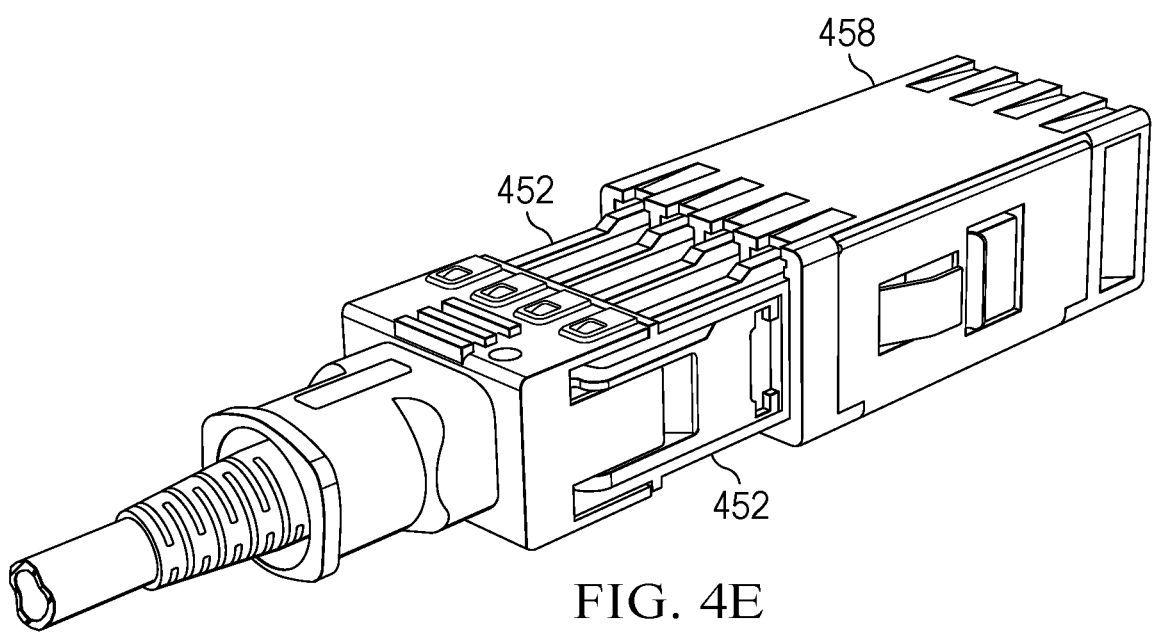

Turning to FIG. 4E, the connectors (452) are shown from a rear perspective view. The four connectors (452) are fitted into the connector adapter (458), which may be one of the connector adapters (405) from FIG. 4A.

Figure 4F:
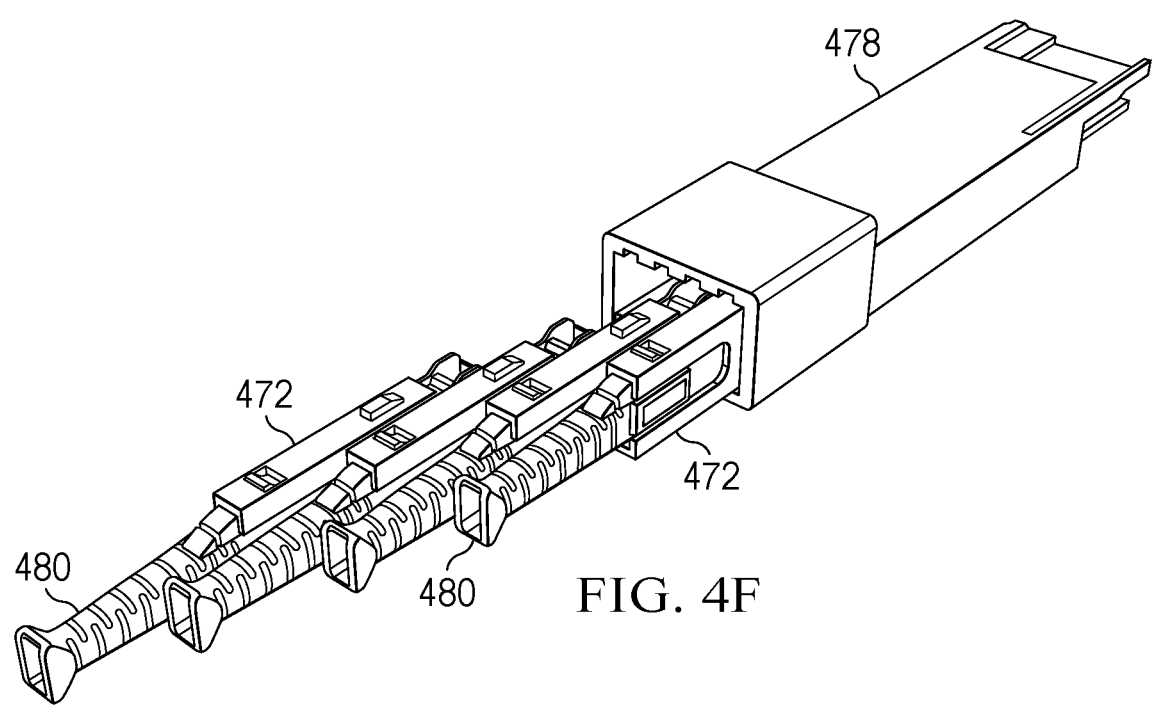

Turning to FIG. 4F, the connectors (472) are shown from a rear perspective view. The four connectors (472) are individually fitted into the connector adapter (458), which may be one of the connector adapters (405) from FIG. 4A. The fibers from the different connectors (472) are not grouped together and may be protected by the individual strain reliefs (480) for each of the connectors (472). The connectors (472) may be very small form factor (VSFF) connectors.

Turning to FIG. 5, a front perspective view of the module (502) is illustrated, which may depict the interior of the module (402) of FIG. 4A. The module (502) may support thirty six fibers. The trunk cable (505) fits into the strain relief (508) and extends through the rear plate (510). The heat shrink (512) provides additional protection and strain relief for the trunk cable (505) where the trunk cable (505) is secured to the bottom half (515) at the tie down (518) with the plastic tie (520). The bottom half (515) includes the rear guide (522) and the front guide (525) used to align a top half (not shown) of the module (502). The fastening members (528) and (530) secure the bottom half (515) to the top half of the module (502). The fibers (532) breakout from the trunk cable (505) and fit to the connectors (535), which fit to the connector adapters (538).

Figure 6A:
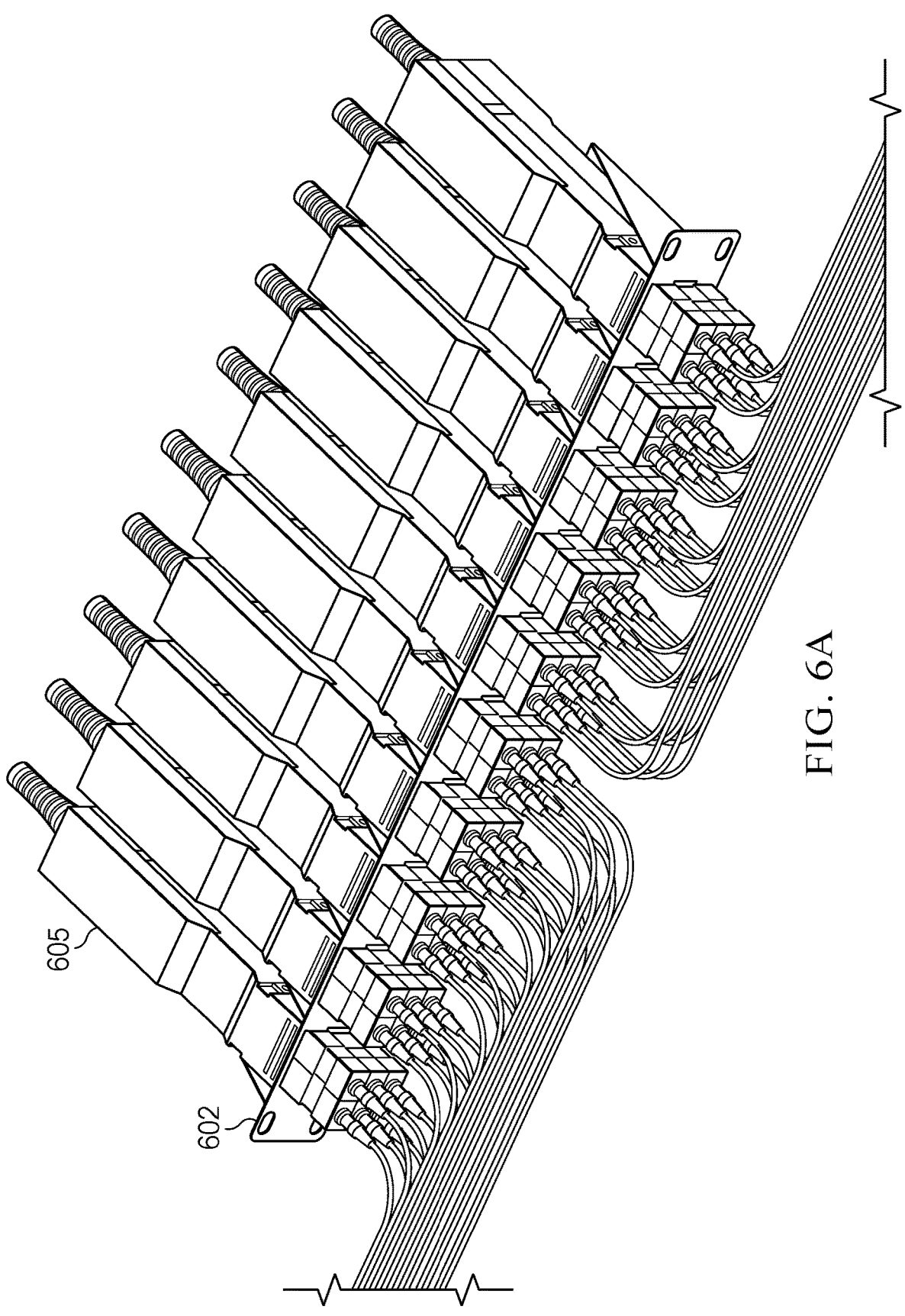

Turning to FIG. 6A, a front perspective view of the panel (602) is illustrated. The panel (602) includes space for ten of the modules (605). The panel (602) and the modules (605) are sized to fit within a 1 U space (1.75 inches) of a 19 inch rack. With two fibers per port, twenty four ports per module, and ten modules per panel, the panel (602) supports four hundred eighty ("480") fibers per panel.

Figure 6B:
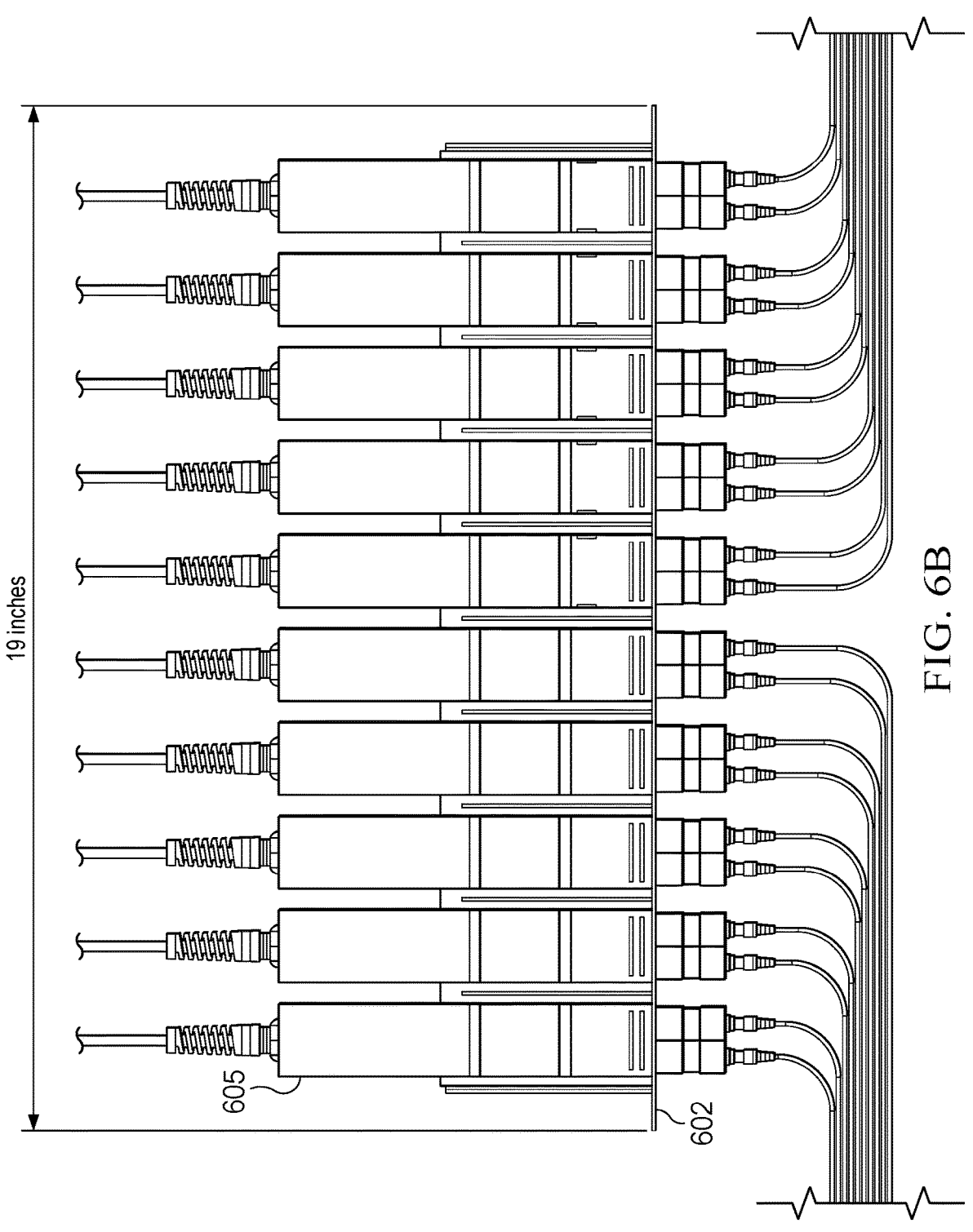

Turning to FIG. 6B, a top view of the panel (602) is illustrated. The width of the panel (602) is 19 inches with a usable space for the modules (605) of 17.75 inches. The panel (602) includes guides and channels for each of the modules (605) to allow the modules (605) to slide into place within the panel (602).

Figure 7A:
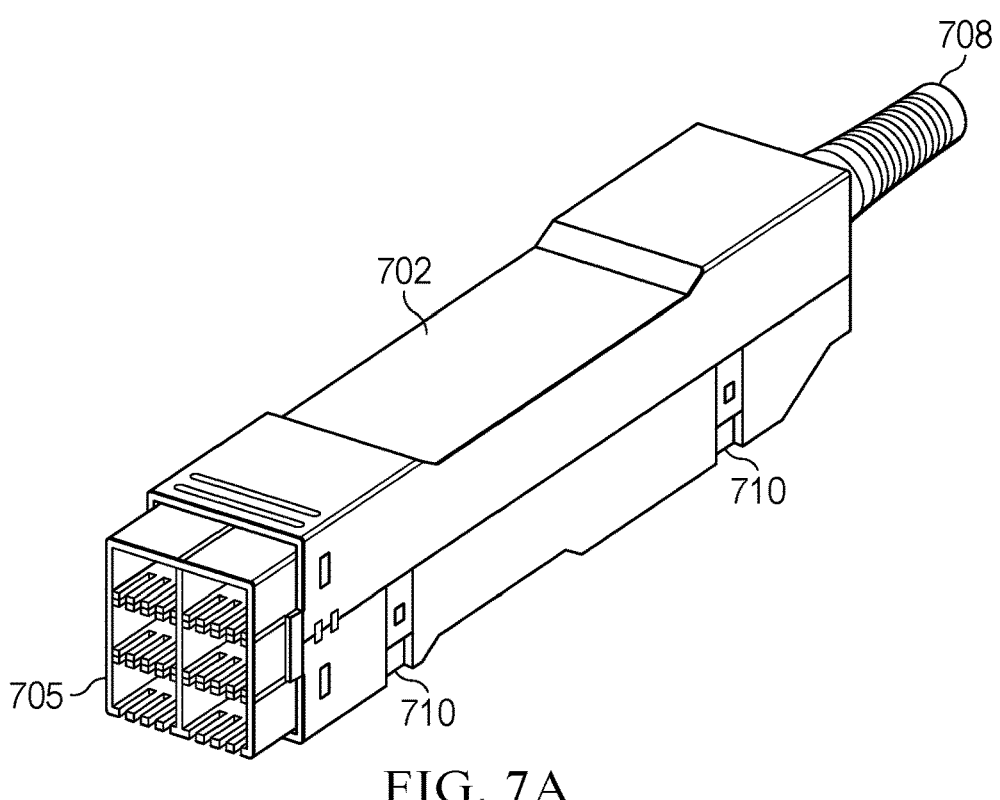

Turning to FIG. 7A, the module (702) includes the connector adapters (705) at a front end of the module (702) with the strain relief (708) at a rear or trunk end of the module (702). The module (702) includes housing with a bottom half that includes the guides (710) to align the bottom half of the module (702) with a top half of the module (702) during assembly. The guides (710) may include integrated fastening features that work in combination with integrated fastening features of the top half of the housing of the module (702) to secure the top half to the bottom half In one embodiment, the connector adapters (705) may each accept four connectors on a front side and on a rear side (i.e., within the module (702)) of the connector adapters (705).

Figure 7B:
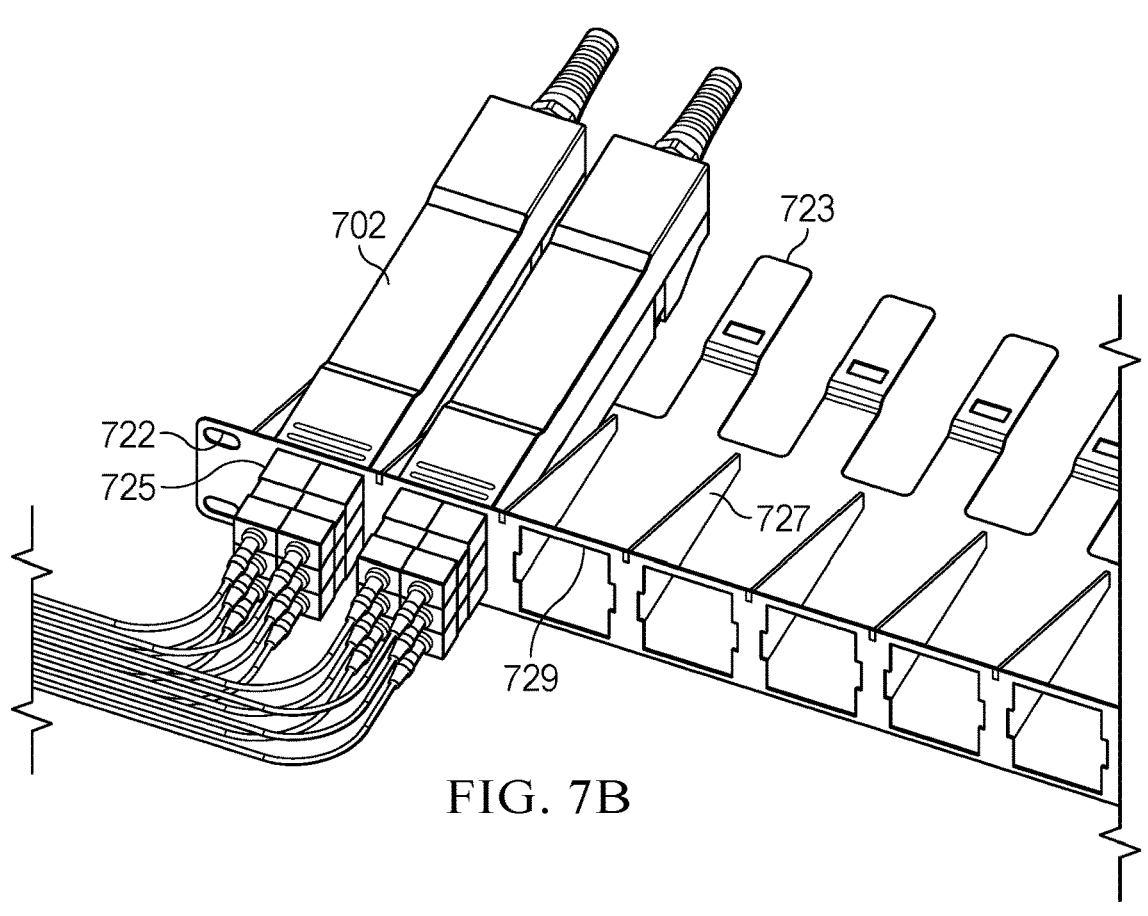

Turning to FIG. 7B, the module (702) is one of multiple modules in the panel (722) in a rack. The module (702) includes connector adapters filed with connectors of external cables. Twenty four connectors (725) are grouped to the six external cables with each of the external cables grouping the fibers from four of the connectors. Each slot in the panel (722) for one of the modules includes the tab (723) shaped to snap fit to the bottom of the module (702). The panel (722) includes the walls (727) to separate the modules (702).

The panel includes the front plate (729) to secure, align, and space the front ends of the modules (702).

Figure 7C:
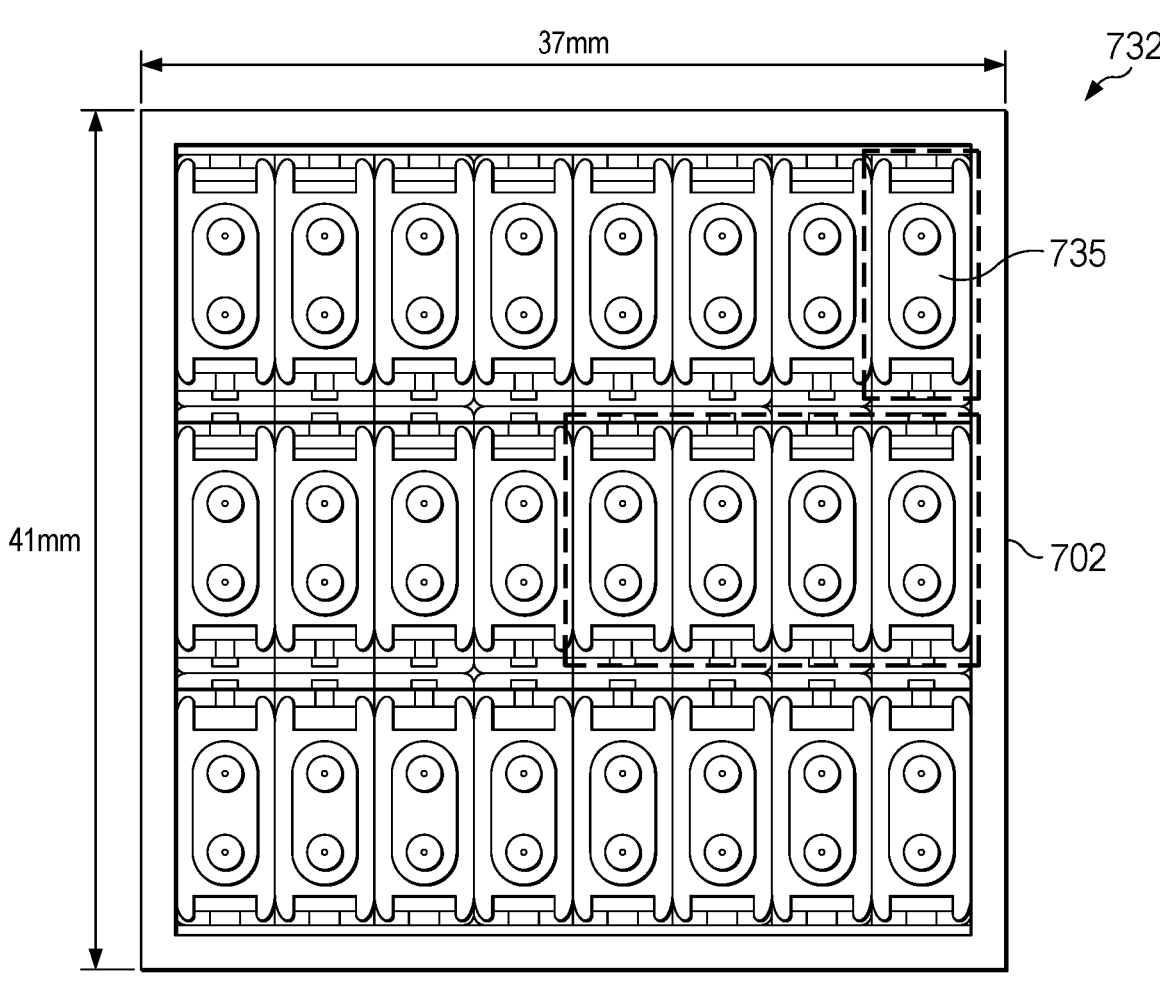

Turning to FIG. 7C, the front end (732) of the module (702) is illustrated. In one embodiment, the module (702) includes twenty four ports (including the port (735)) configured for two fibers per port. In one embodiment, each row may support eight ports (with two fibers per port). In one embodiment, the module (702) supports at least forty eight fibers. In one embodiment, the height of the module (702) is 41 millimeters with a tolerance of ±0.03 inches (or ±0.76 millimeters). Different heights of the module may be used, in conjunction with a panel, to fill the 1.75 inch (44.45 millimeters) height available in 1 U of a rack. In one embodiment, the width of the module (702) is 37 millimeters with a tolerance of ±0.03 inches (or ±0.76 millimeters). Different widths of the module may be used. The width of the module (702) may be determined from the width of the connectors multiplied by the number of connectors in a row plus an offset amount for the width of the walls of the housing of the module (702).

Figure 7D:
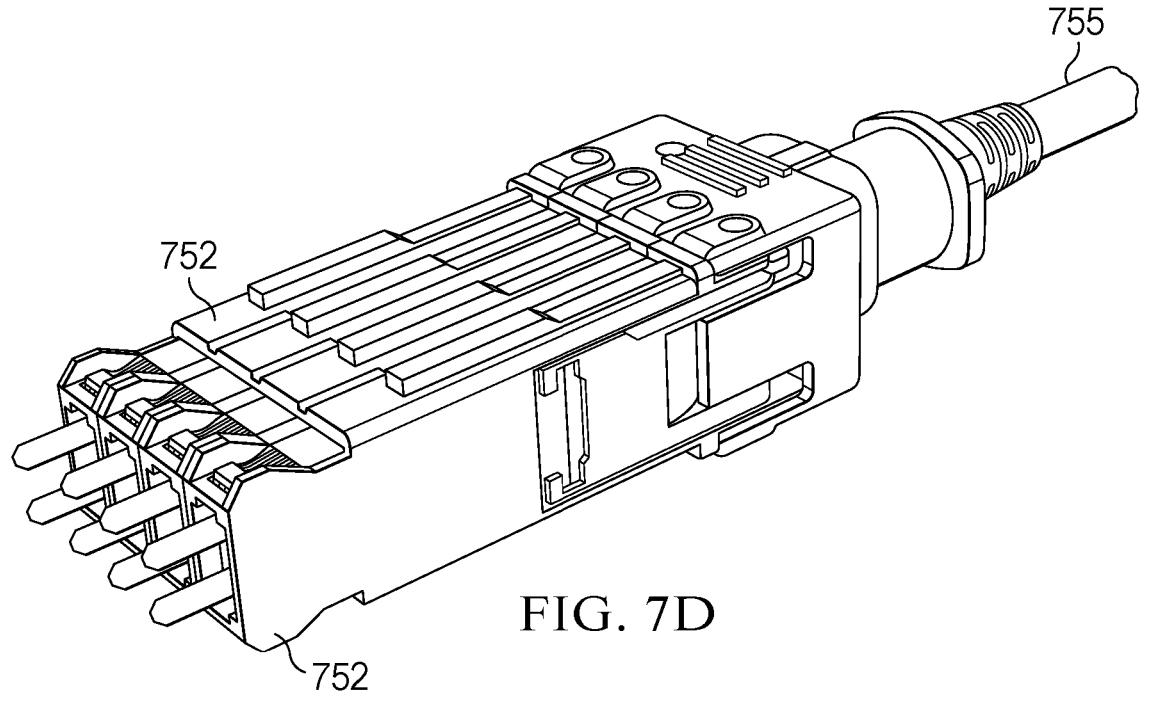

Turning to FIG. 7D, the connectors (752) are shown from a front perspective view. The four connectors (752) are clustered together. The fibers within the connectors (752) are grouped together into the cable (755). The connectors (752) may be fitted to an external side of the connector adapters (705) of FIG. 7A or to an internal side (i.e., within the module (702) of FIG. 7A) of the connector adapters (705) of FIG. 7A.

Figure 7E:
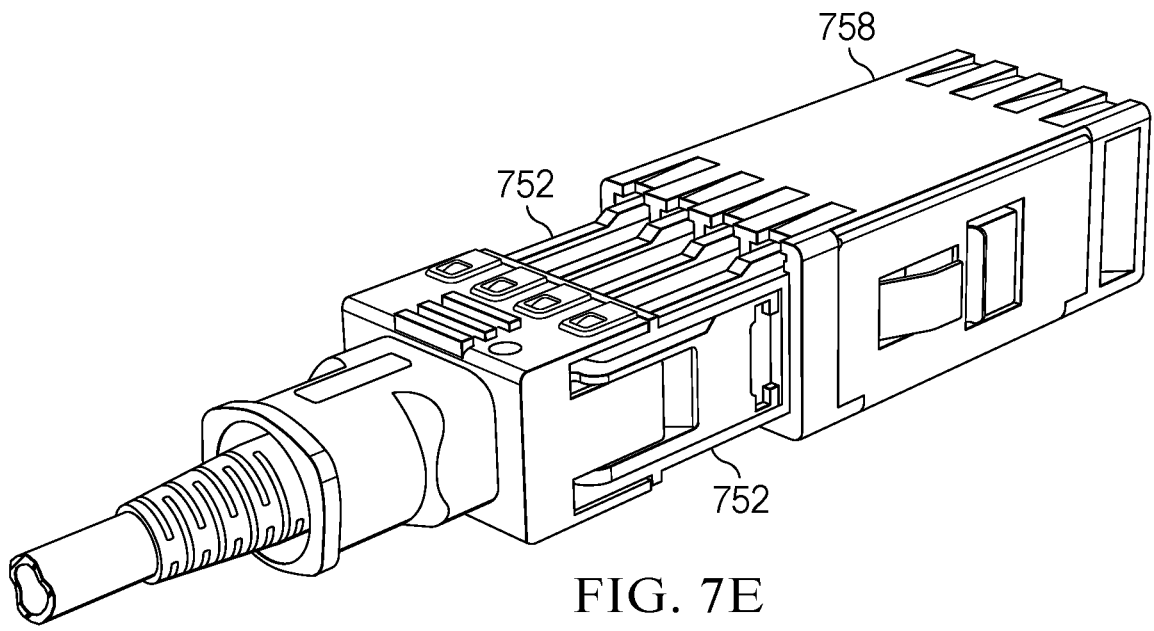

Turning to FIG. 7E, the connectors (752) are shown from a rear perspective view. The four connectors (752) are fitted into the connector adapter (758), which may be one of the connector adapters (705) from FIG. 7A.

Figure 7F:
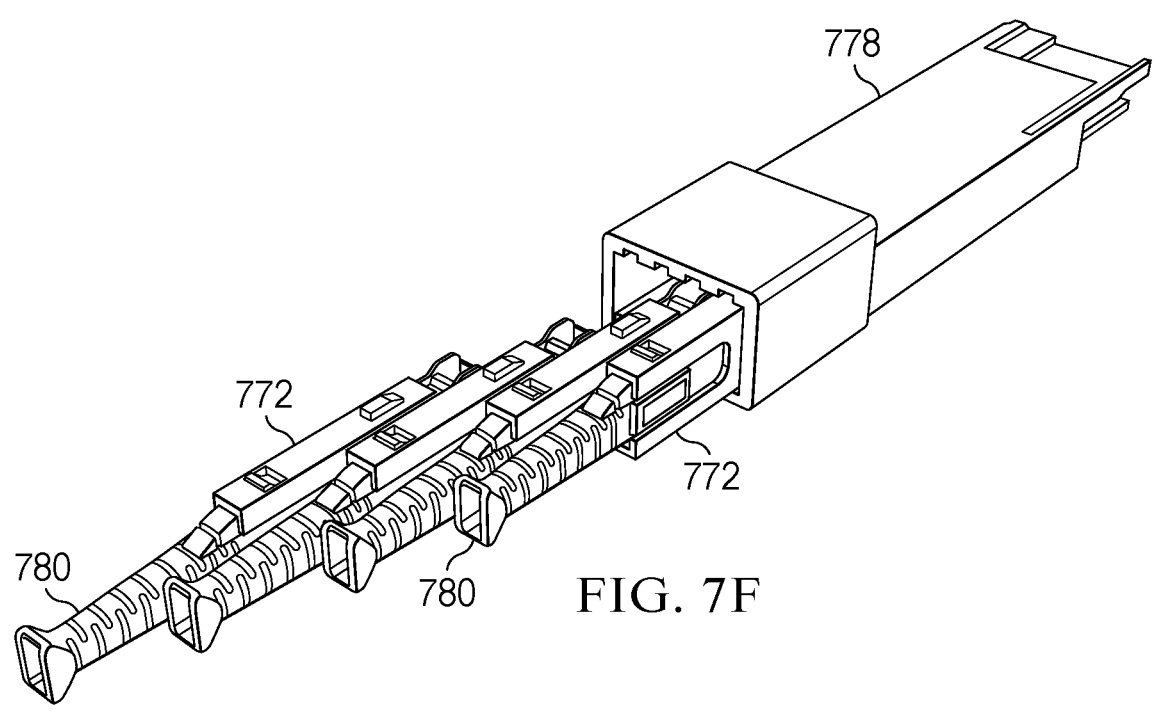

Turning to FIG. 7F, the connectors (772) are shown from a rear perspective view. The four connectors (772) are individually fitted into the connector adapter (778), which may be one of the connector adapters (705) from FIG. 7A. The fibers from the different connectors (772) are not grouped together and may be protected by the individual strain reliefs (780) for each of the connectors (772). The connectors (772) may be very small form factor (VSFF) connectors.

Turning to FIG. 8, a front perspective view of the module (802) is illustrated, which may depict the interior of the module (702) of FIG. 7A. The module (802) may support forty eight fibers. The trunk cable (805) fits into the strain relief (808) and extends through the rear plate (810). The heat shrink (812) provides additional protection and strain relief for the trunk cable (805) where the trunk cable (805) is secured to the bottom half (815) at the tie down (818) with the plastic tie (820). The bottom half (815) includes the rear guide (822) and the front guide (825) used to align a top half (not shown) of the module (802). The fastening members (828) and (830) secure the bottom half (815) to the top half of the module (802). The fibers (832) breakout from the trunk cable (805) and fit to the connectors (835), which fit to the connector adapters (838).

Figure 9A:
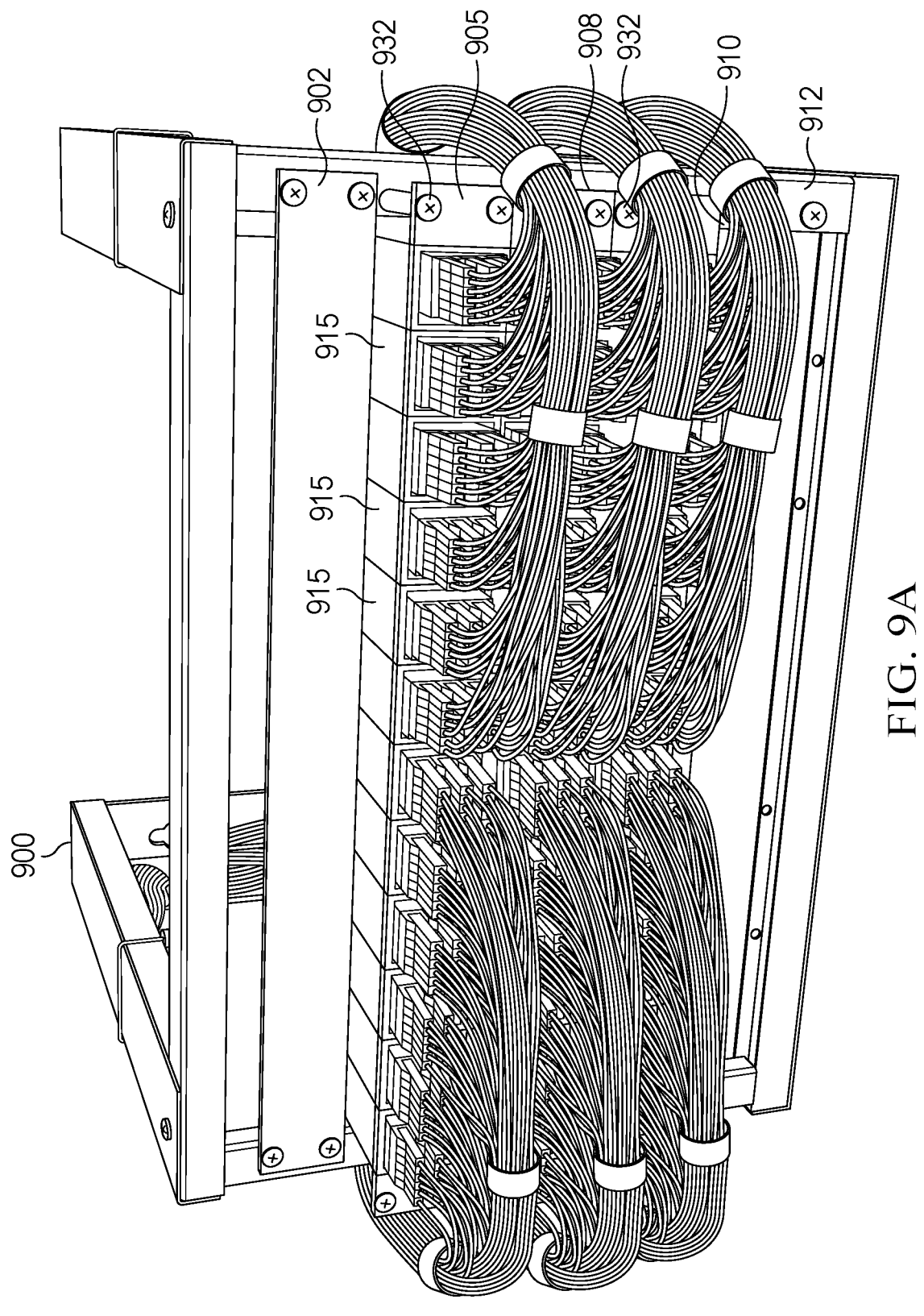

Turning to FIG. 9A, the rack (900) includes the panels (902) through (912) with the modules (915). The modules (915) may use connectors that support sixteen fibers per connector. The rack (900) is a 5 U 19 inch rack with standardized dimensions and five slots for panels. The panels (902) and (912) are blank panels to cover a slot of the rack (900). The panels (905), (908), and (910) each include twelve of the modules (915) to route and connect optical fibers for a communication network. Each of the modules (915) includes connector adapters for three rows of connectors with six connectors per row. The modules (915) may snap into place into the panels (905), (908), and (910).

The panels (905), (908), and (910) are secured to the rack (900) with fastening members including the bolts (932). The ends of the panels (905), (908), and (910), as well as their corresponding modules (915), extend past the front end of the rack (900). With sixteen fibers per port, eighteen ports per module, twelve modules per panel, and five panels per 5 U rack, the rack (900) supports three thousand four hundred fifty six ("3,456") fibers per panel and seventeen thousand two hundred eighty ("17,280") fibers per 5 U rack.

Figure 9B:
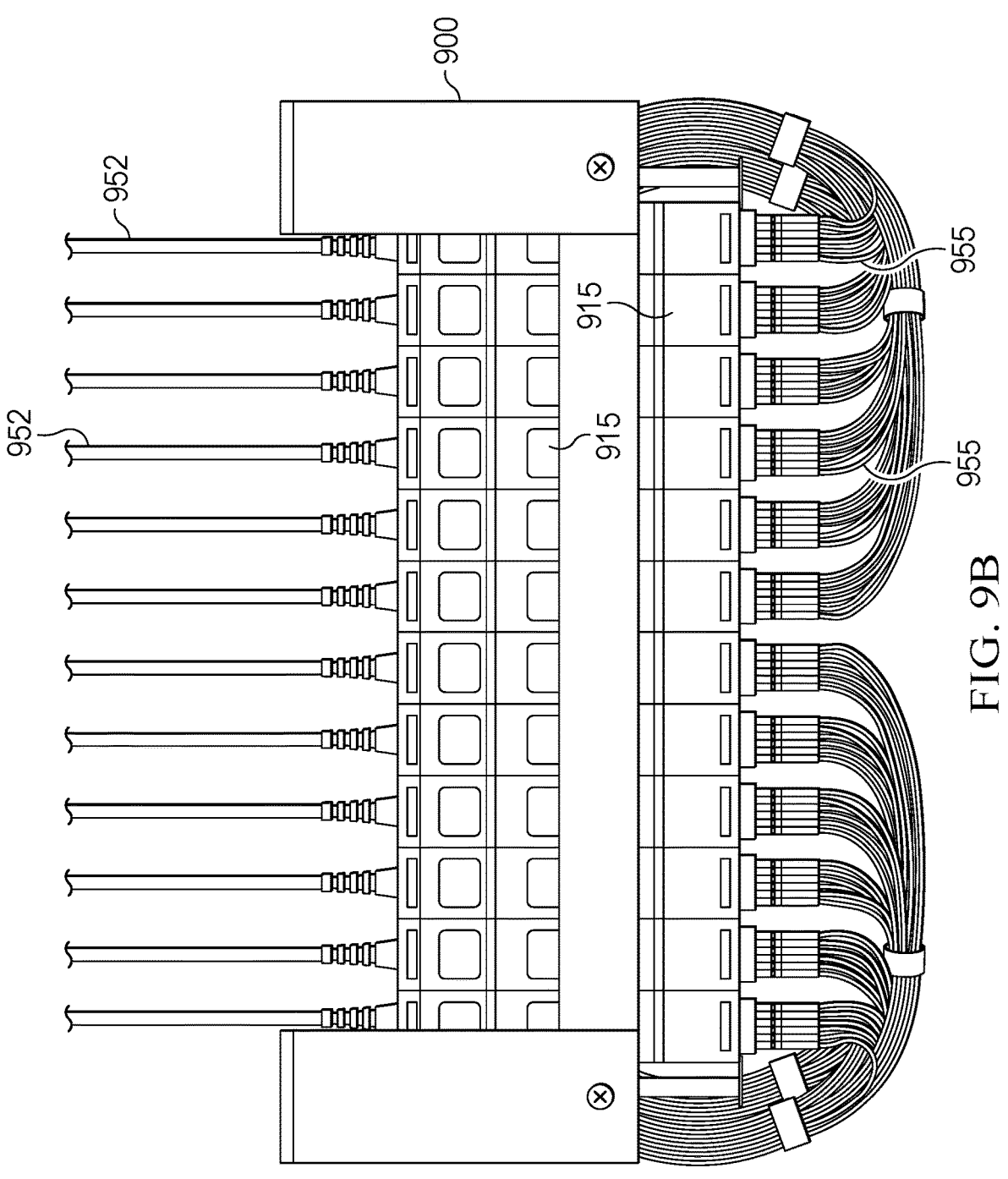

Turning to FIG. 9B, the modules (915) connect the trunk cables (952) at the rear of the rack (900) to the bundles of cables (955) at the front of the rack (900). In one embodiment, the modules (915) extend past the front of the rack (900) within plus or minus ten percent ("10%") of the 1 U rack height for the rack (900). The modules (915) may be inserted through the front of the rack (900) or through the rear of the rack (900).

Figure 10A:
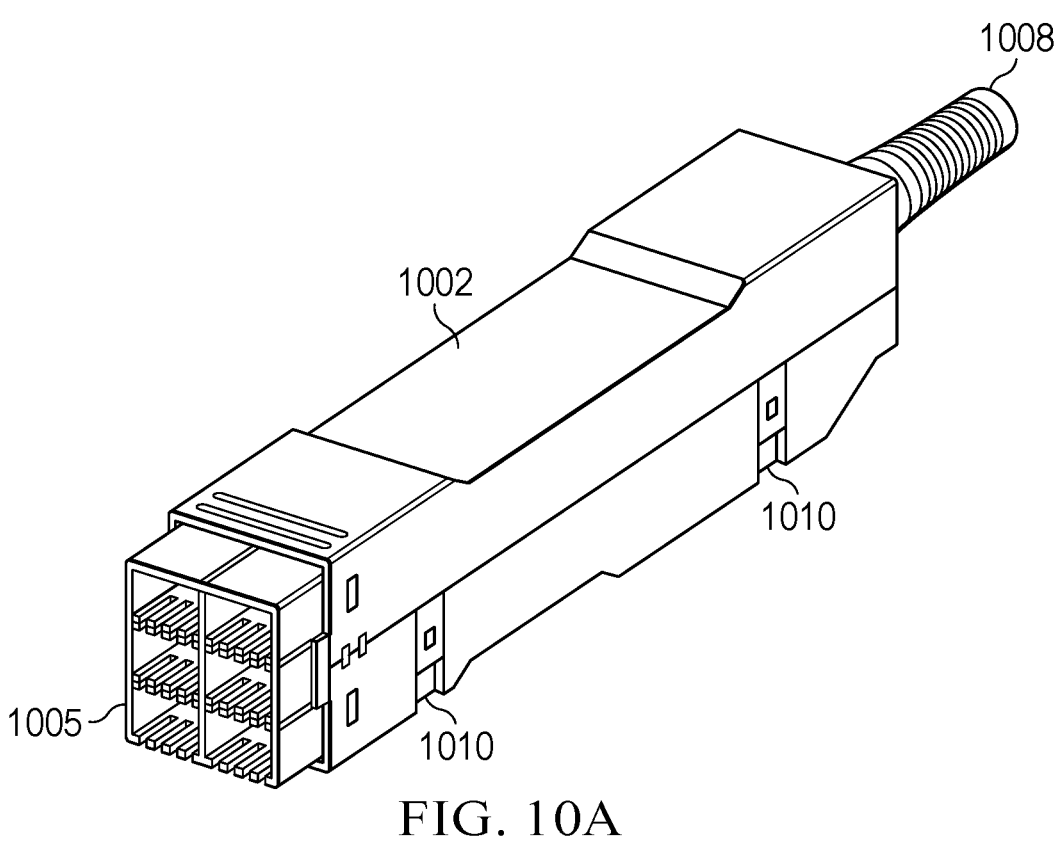

Turning to FIG. 10A, the module (1002) includes the connector adapters (1005) at a front end of the module (1002) with the strain relief (1008) at a rear or trunk end of the module (1002). The module (1002) includes housing with a bottom half that includes the guides (1010) to align the bottom half of the module (1002) with a top half of the module (1002) during assembly. The guides (1010) may include integrated fastening features that work in combination with integrated fastening features of the top half of the housing of the module (1002) to secure the top half to the bottom half.

Figure 10B:
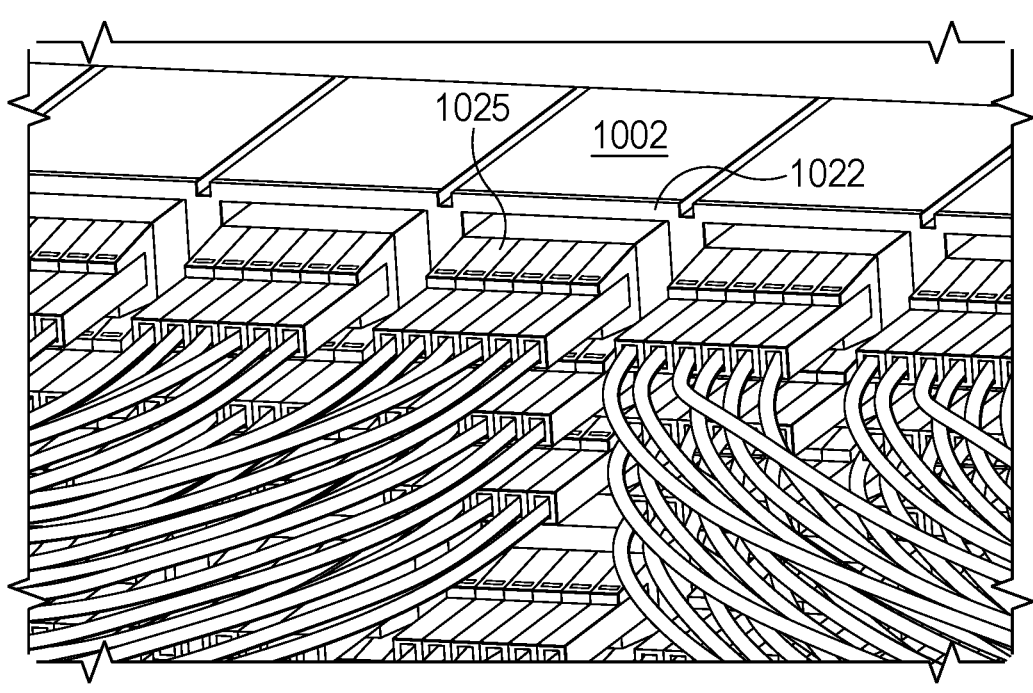

Turning to FIG. 10B, the module (1002) is one of multiple modules in the panel (1022) in a rack. The module (1002) includes connector adapters exposing ports that are filled with eighteen connectors (1025) that terminate external cables.

Figures 10C, 10D:
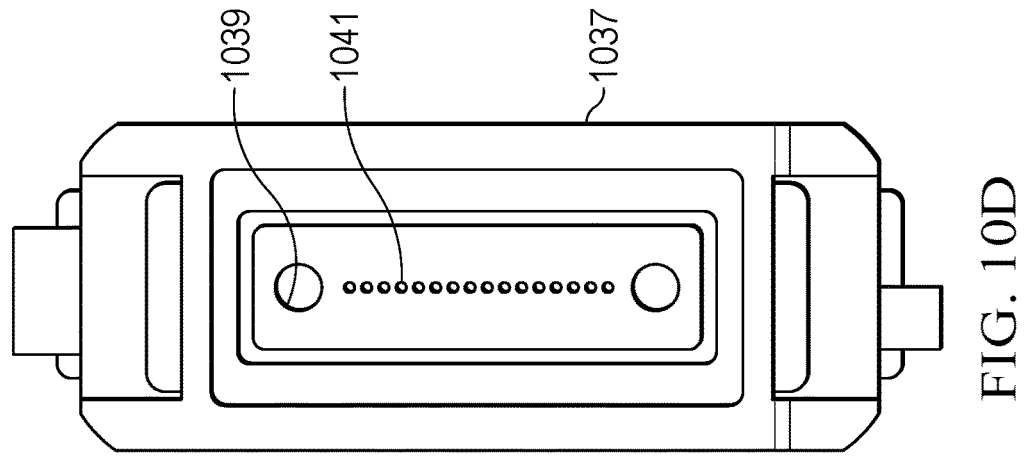

Turning to FIG. 10C, the front end (1032) of the module (1002) is illustrated. In one embodiment, the module (1002) includes eighteen ports (including the port (1035)) configured for sixteen fibers per port. In one embodiment, each row may support six ports (with sixteen fibers per port). In one embodiment, the module (1005) supports at least two hundred eighty eight fibers. In one embodiment, a panel with twelve modules supports at least three thousand four hundred fifty six fibers. In one embodiment, the height of the module (1002) is 41 millimeters with a tolerance of ±0.03 inches (or ±0.76 millimeters). Different heights of the module may be used, in conjunction with a panel, to fill the 1.75 inch (44.45 millimeters) height available in 1 U of a rack. In one embodiment, the width of the module (1002) is 37 millimeters with a tolerance of ±0.03 inches (or ±0.76 millimeters). Different widths of the module may be used. The width of the module (1002) may be determined from the width of the connectors multiplied by the number of connectors in a row plus an offset amount for the width of the walls of the housing of the module (1002).

Turning to FIG. 10D, a front view of the connector (1037) is illustrated. The connector (1037) is a female connector with the alignment holes (1039), between which are the sixteen fiber holes (1041).

Figure 10E:
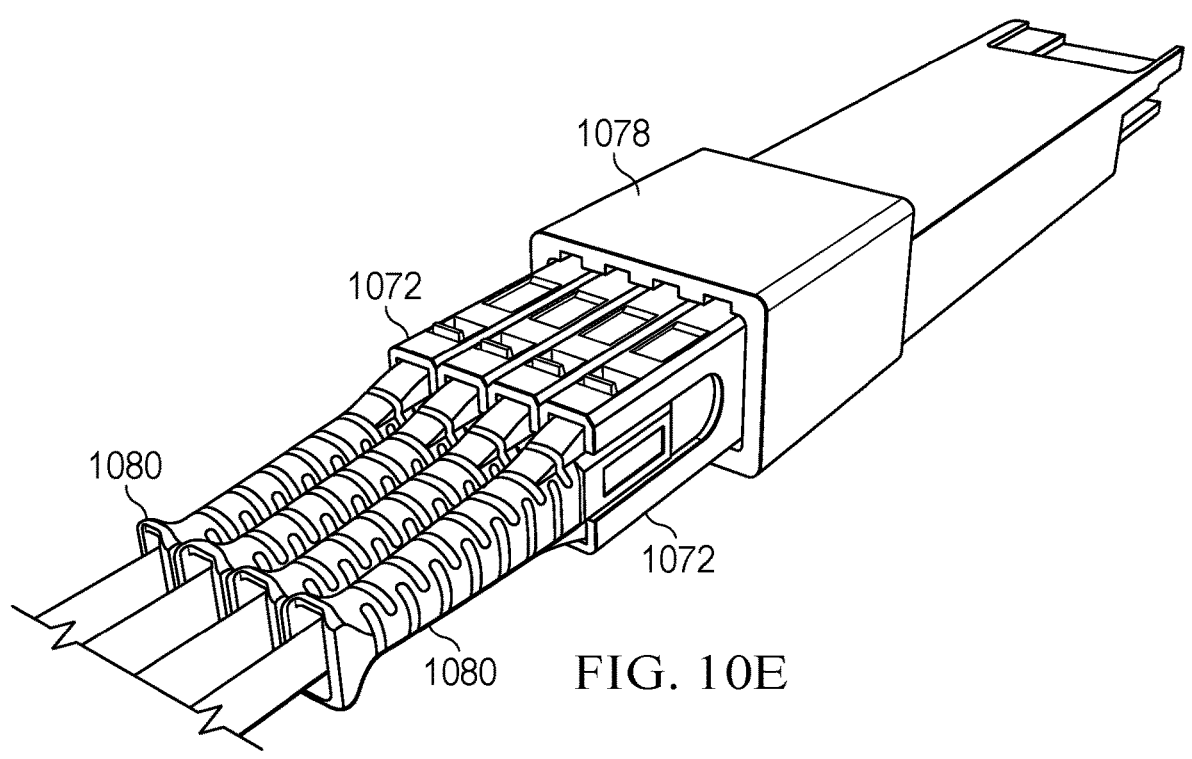

Turning to FIG. 10E, the connectors (1072) are shown from a rear perspective view. The four connectors (1072) are individually fitted into the connector adapter (1078), which may be one of the connector adapters (1005) from FIG. 10A. The fibers from the different connectors (1072) are not grouped together and may be protected by the individual strain reliefs (1080) for each of the connectors (1072). The connectors (1072) may be very small form factor (VSFF) connectors.

Figure 10F:
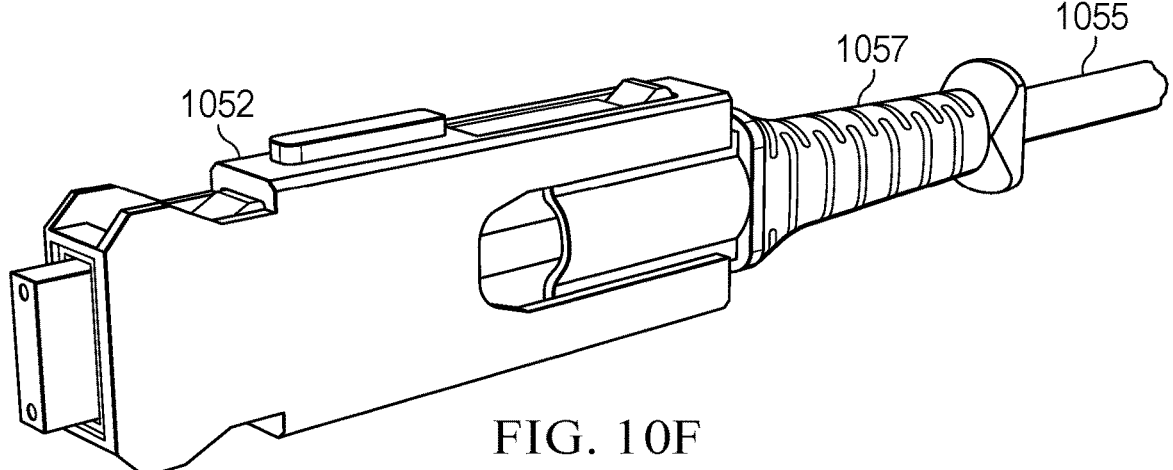

Turning to FIG. 10F, the connector (1052) is shown from a front perspective view. The fibers within the connector (1052) are grouped together into the cable (1055), which is protected by the strain relief (1057). The connector (1052) may be fitted to an external side of the connector adapters (1005) of FIG. 10A or to an internal side (i.e., within the module (1002) of FIG. 10A) of the connector adapters (1005) of FIG. 10A.

Figure 11A:
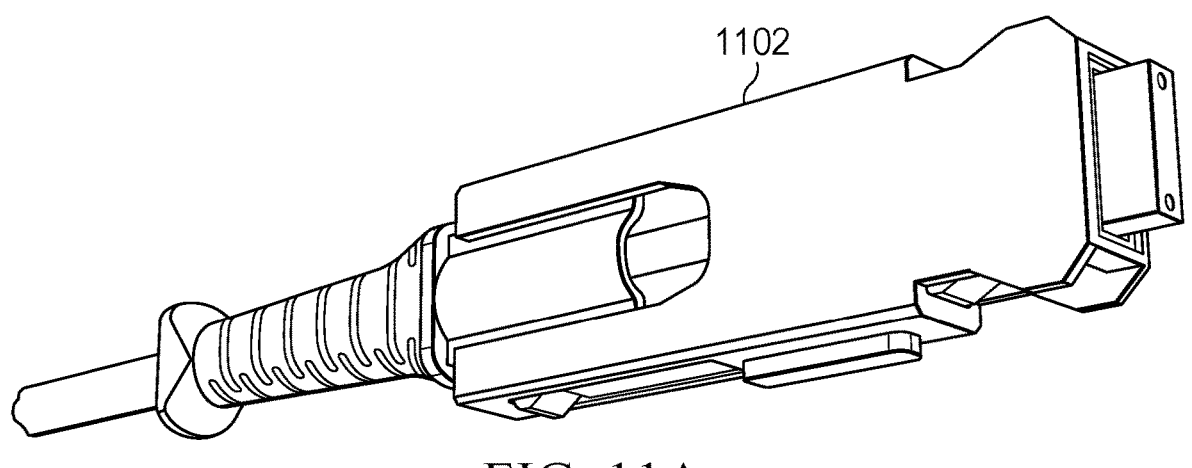

Turning to FIG. 11A, the connector (1102) is illustrated. The connector (1102) is a female connector for sixteen fibers.

Figure 11B:
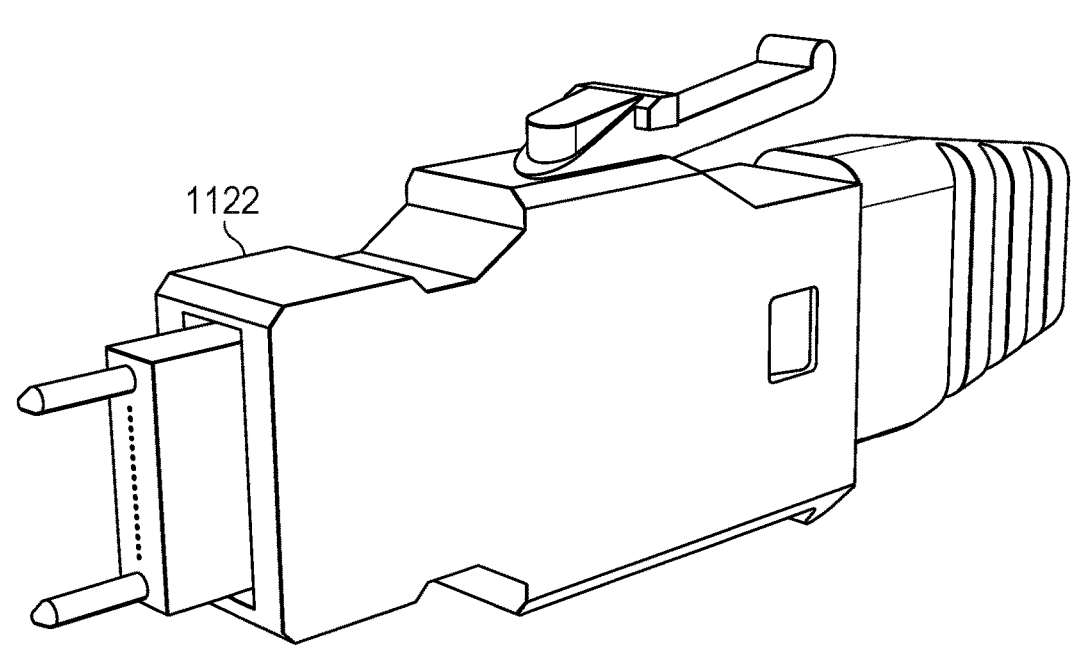

Turning to FIG. 11B, the connector (1122) is illustrated. The connector (1102 is a male connector for sixteen fibers.

Figure 11C:
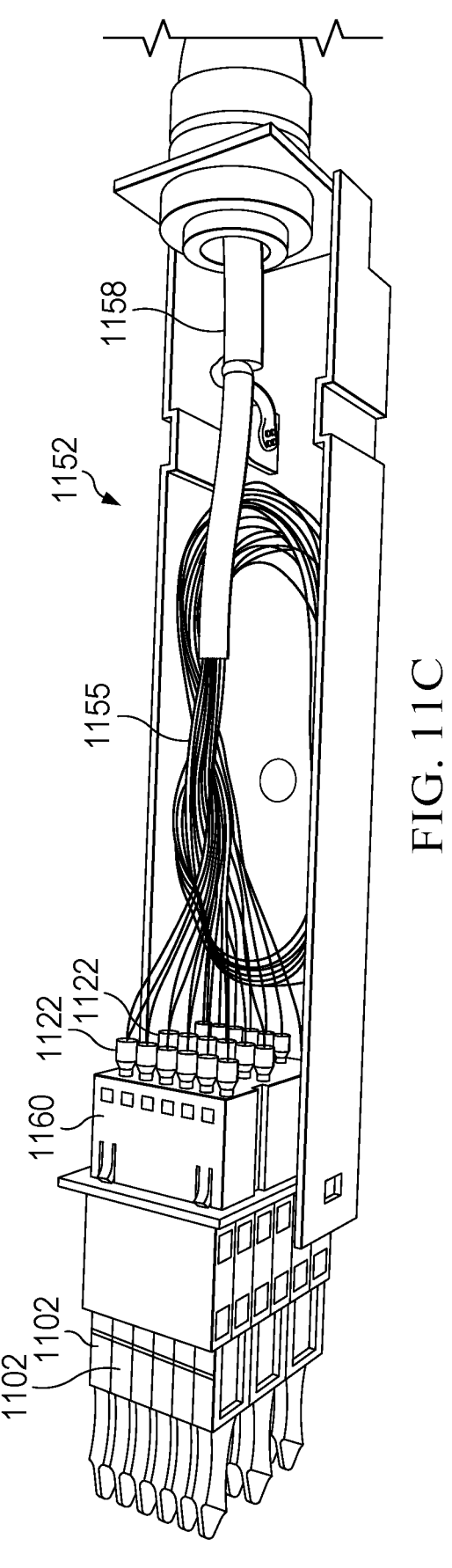

Turning to FIG. 11C, the module (1152) is shown with a top half of the housing of the module (1152) removed to show the interior of the module (1152). The fibers (1155) extend from the trunk cable (1158) into the connectors (1122). The connectors (1122) are inserted into an interior side of the connector adapter (1160). The connector adapter (1160) includes three rows with six ports per row for eighteen ports. An exterior end of the connector adapter (1160) extends out from a front end of the module (1152). The connectors (1102) are fitted to the exterior end of the connector adapter (1160).

Figure 12A:
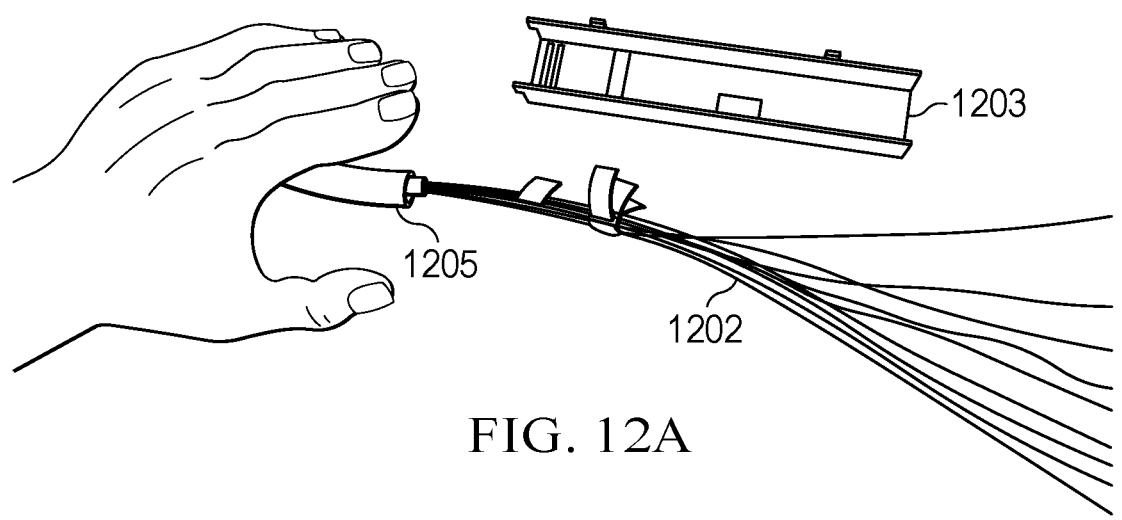
Figure 12B:
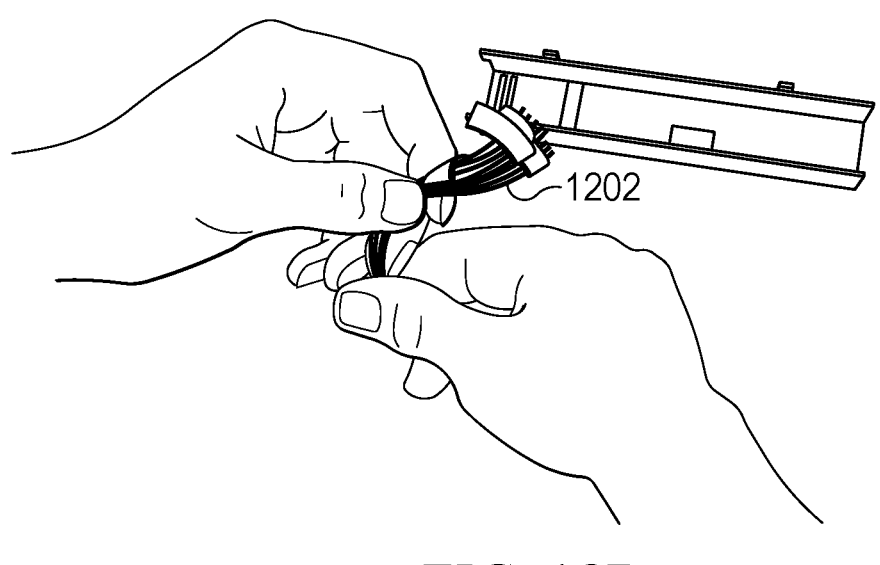
Figures 12C, 12D:
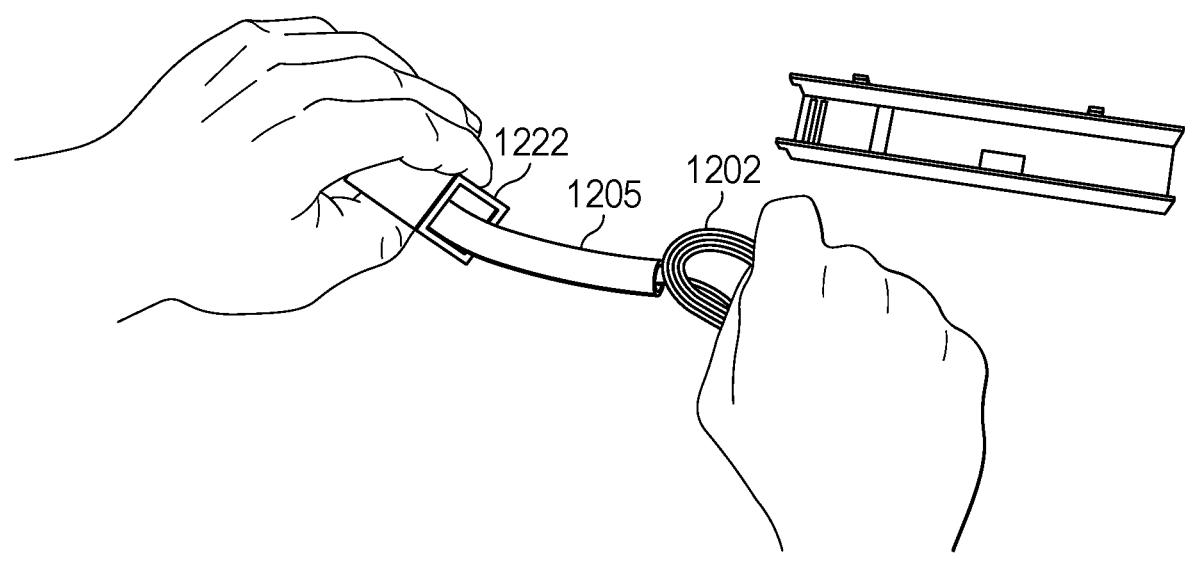
Figures 12E, 12F:
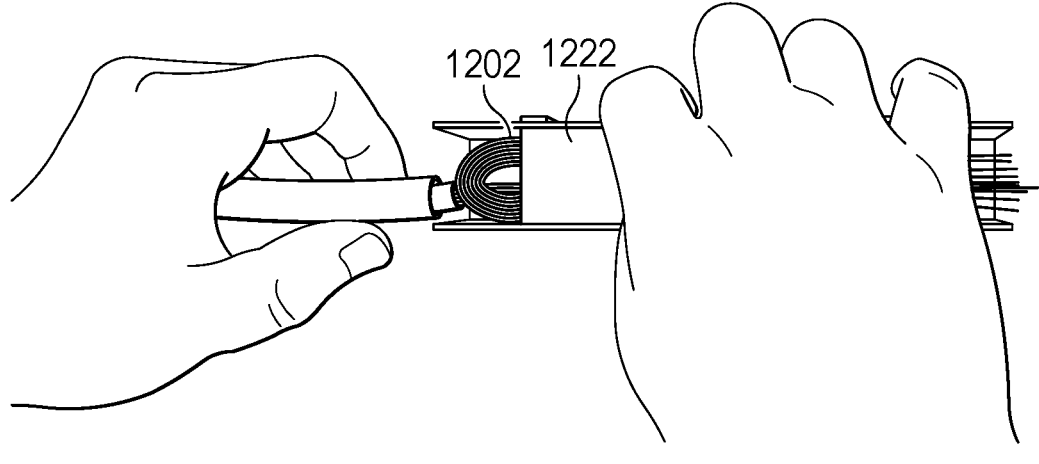

FIGS. 12A through 12F illustrate a method of installing fibers into a module. The process may be performed manually or with automated equipment. Turning to FIG. 12A, the fibers (1202) extend out by ten inches (plus or minus, e.g., 0.2 inches) from the trunk cable (1205) after removing the shielding from the trunk cable (1205) next to the portion (1203) of the housing of a module being constructed. Turning to FIG. 12B, the fibers are walked into an oval shape with a width of 24 millimeters (plus or minus, e.g., 2 millimeters). Turning to FIG. 12C, the fiber retainer (1222) slides along the trunk cable (1205) towards the fibers (1202). Turning to FIG. 12D, the fiber retainer (1222) slides into place to form and protect the fibers (1202). Turning to FIG. 12E, the fiber retainer (1222) is placed into the portion (1203) of the housing of the module being constructed. Turning to FIG. 12F, the fiber retainer (1222) is fitted within the portion (1203) of the housing of the module being constructed and the fibers (1202) are restrained and protected.

Figure 13A:
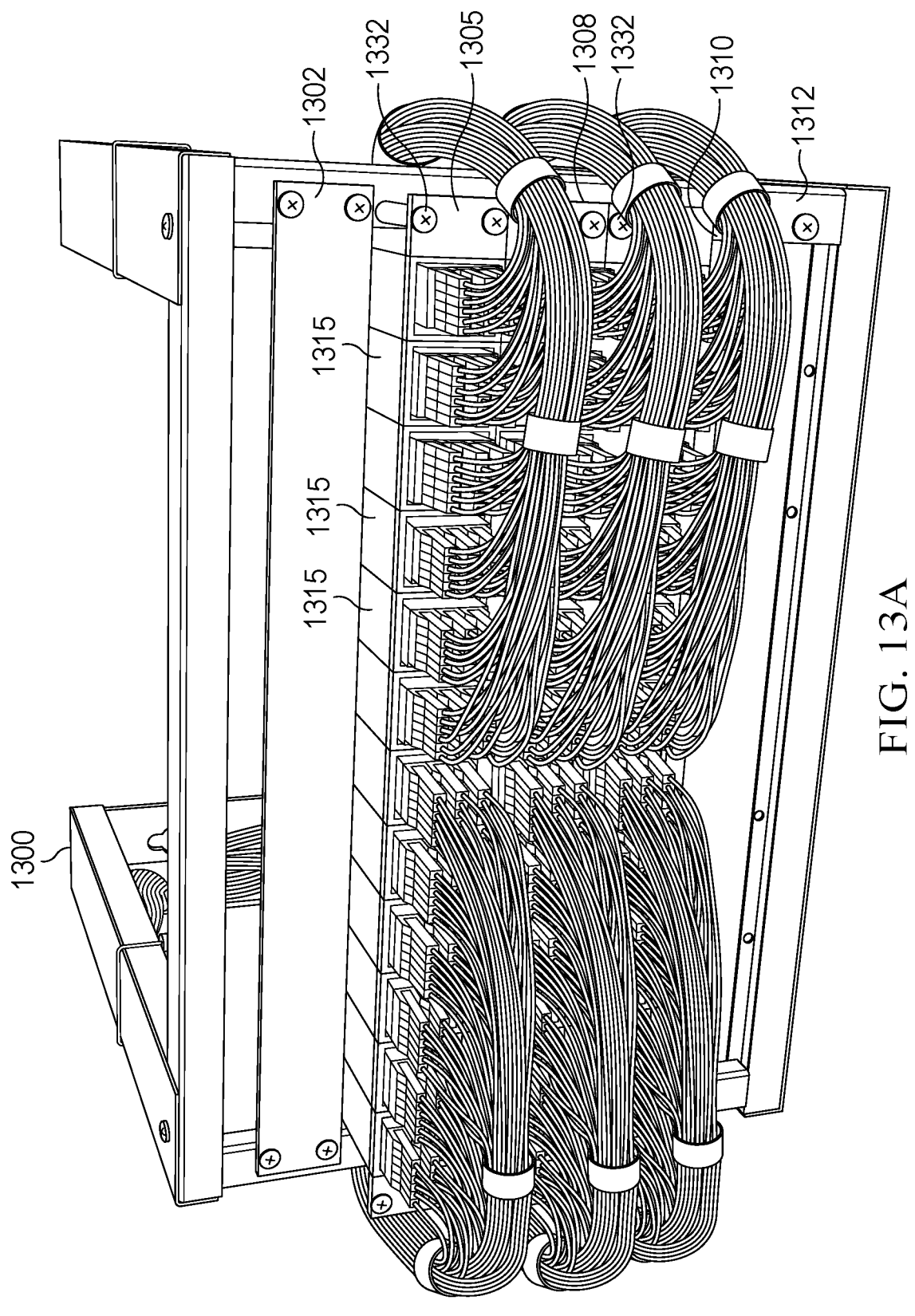

Turning to FIG. 13A, the rack (1300) includes the panels (1302) through (1312) with the modules (1315). The modules (1315) may use connectors that support thirty two fibers per connector. The rack (1300) is a 5 U 19 inch rack with standardized dimensions and five slots for panels. The panels (1302) and (1312) are blank panels to cover a slot of the rack (1300). The panels (1305), (1308), and (1310) each include twelve of the modules (1315) to route and connect optical fibers for a communication network. Each of the modules (1315) includes connector adapters for three rows of connectors with six connectors per row. The modules (1315) may snap into place into the panels (1305), (1308), and (1310).

The panels (1305), (1308), and (1310) are secured to the rack (1300) with fastening members including the bolts (1332). The ends of the panels (1305), (1308), and (1310), as well as their corresponding modules (1315), extend past the front end of the rack (1300). With thirty two fibers per port, eighteen ports per module, twelve modules per panel, and five panels per 5 U rack, the rack (1300) supports six thousand nine hundred twelve ("6,912") fibers per panel and thirty four thousand five hundred sixty ("34,560") fibers per 5 U rack.

Figure 13B:
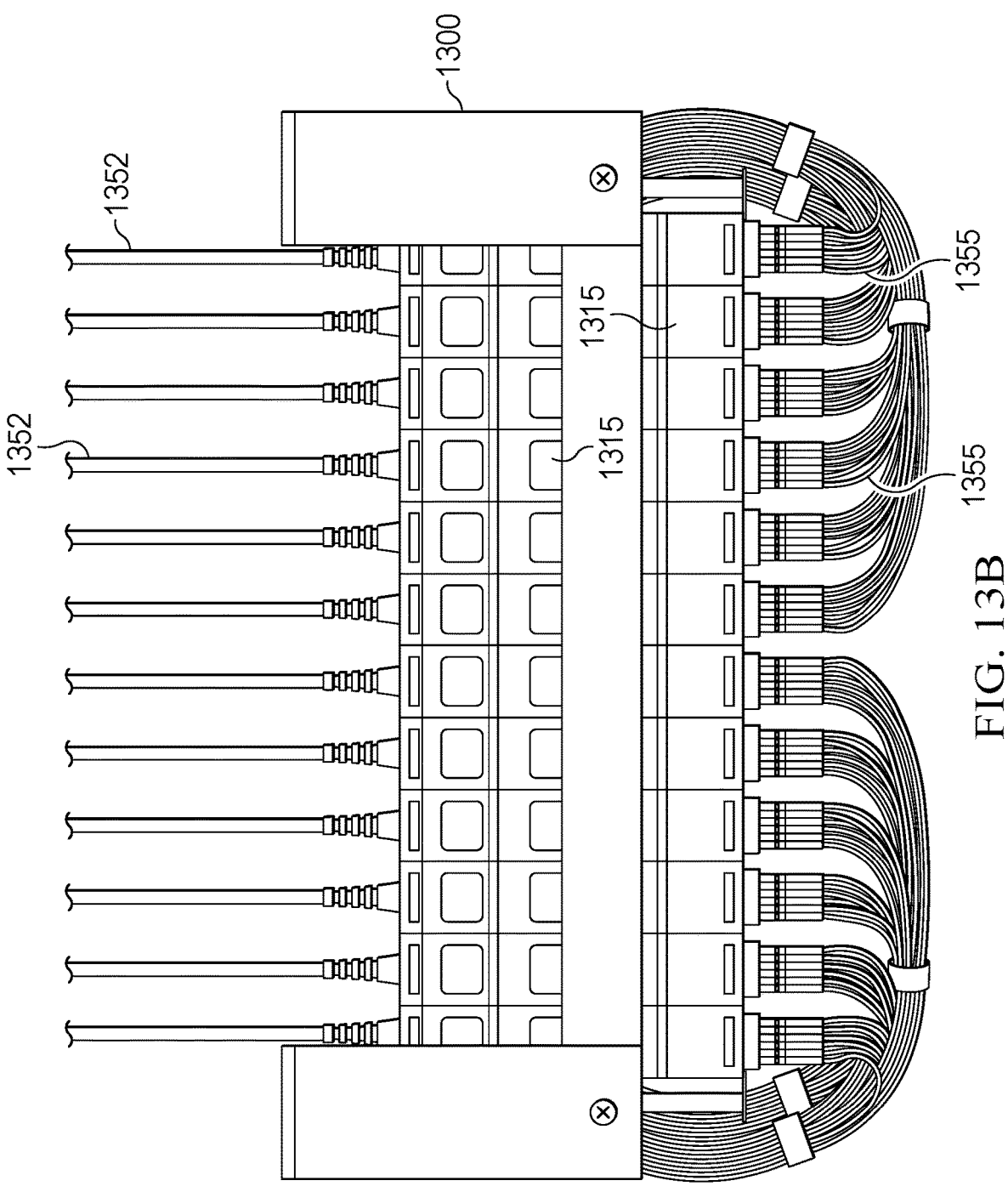

Turning to FIG. 13B, the modules (1315) connect the trunk cables (1352) at the rear of the rack (1300) to the bundles of cables (1355) at the front of the rack (1300). In one embodiment, the modules (1315) extend past the front of the rack (1300) within plus or minus ten percent ("10%") of the 1 U rack height for the rack (1300). The modules (1315) may be inserted through the front of the rack (1300) or through the rear of the rack (1300).

Figure 14A:
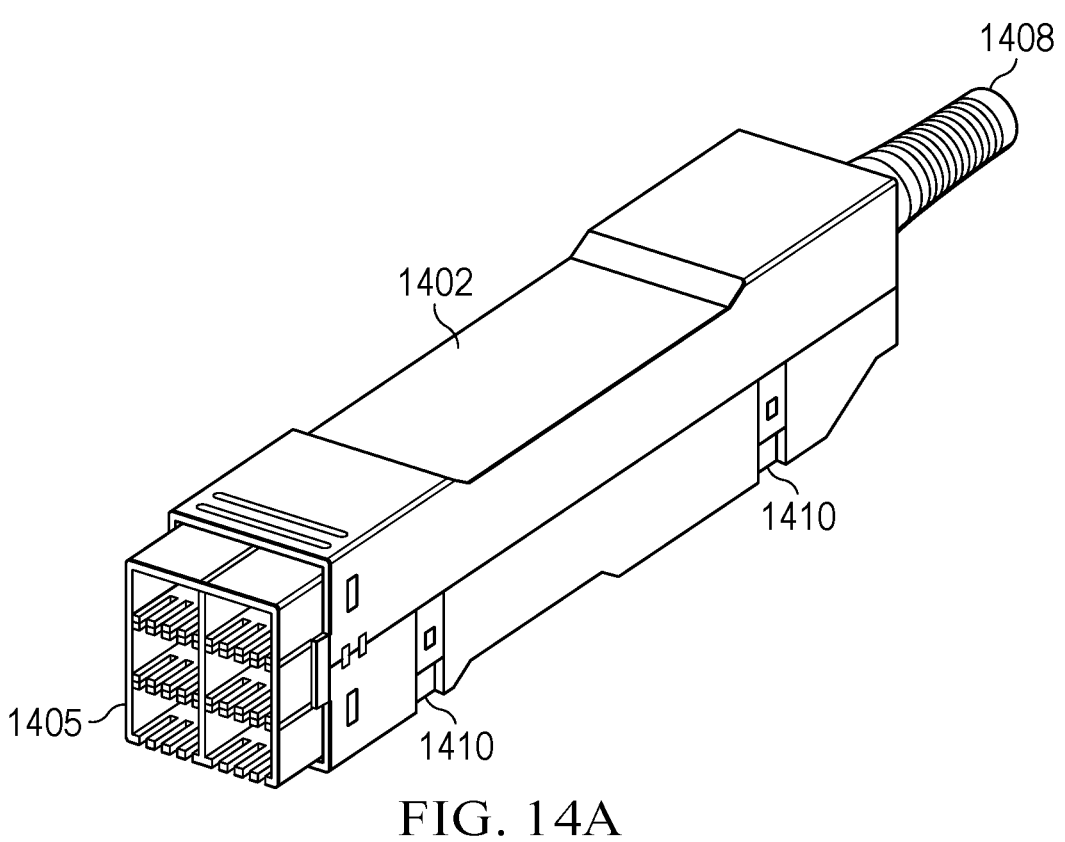

Turning to FIG. 14A, the module (1402) includes the connector adapters (1405) at a front end of the module (1402) with the strain relief (1408) at a rear or trunk end of the module (1402). The module (1402) includes housing with a bottom half that includes the guides (1410) to align the bottom half of the module (1402) with a top half of the module (1402) during assembly. The guides (1410) may include integrated fastening features that work in combination with integrated fastening features of the top half of the housing of the module (1402) to secure the top half to the bottom half.

Figure 14B:
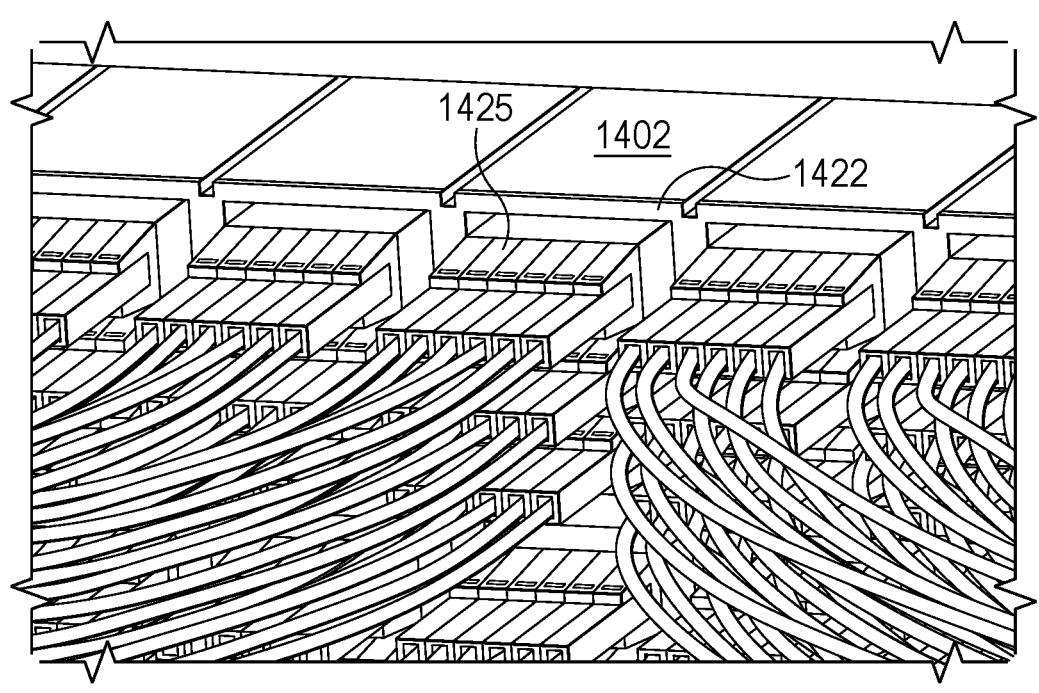

Turning to FIG. 14B, the module (1402) is one of multiple modules in the panel (1422) in a rack. The module (1402) includes connector adapters exposing ports that are filled with eighteen connectors (1425) that terminate external cables.

Figures 14C, 14D:
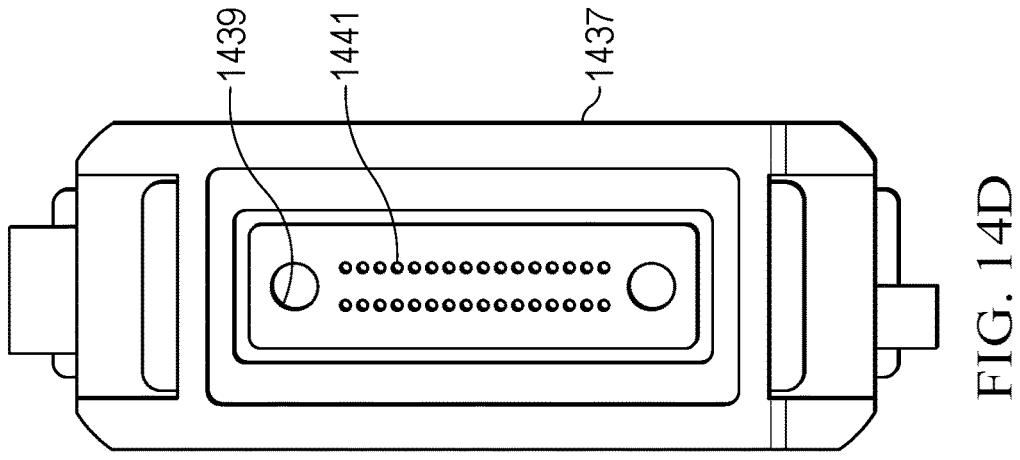

Turning to FIG. 14C, the front end (1432) of the module (1402) is illustrated. In one embodiment, the module (1402) includes eighteen ports (including the port (1435)) configured for thirty two fibers per port. In one embodiment, each row may support six ports (with thirty two fibers per port). In one embodiment, the module (1405) supports at least two hundred eighty eight fibers. In one embodiment, a panel with twelve modules supports at least six thousand nine hundred twelve fibers. In one embodiment, the height of the module (1402) is 41 millimeters with a tolerance of ±0.03 inches (or ±0.76 millimeters). Different heights of the module may be used, in conjunction with a panel, to fill the 1.75 inch (44.45 millimeters) height available in 1 U of a rack. In one embodiment, the width of the module (1402) is 37 millimeters with a tolerance of ±0.03 inches (or ±0.76 millimeters). Different widths of the module may be used. The width of the module (1402) may be determined from the width of the connectors multiplied by the number of connectors in a row plus an offset amount for the width of the walls of the housing of the module (1402).

Turning to FIG. 14D, a front view of the connector (1437) is illustrated. The connector (1437) is a female connector with the alignment holes (1439), between which are the thirty two fiber holes (1441).

Figure 14E:
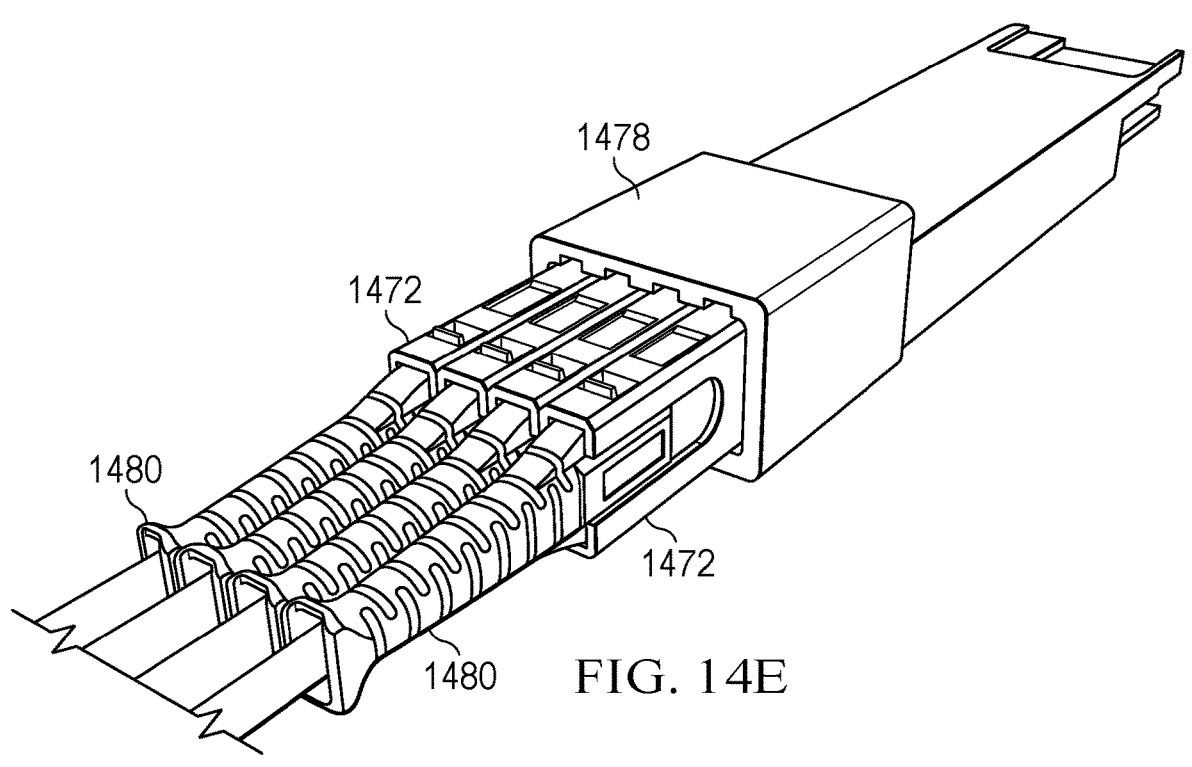

Turning to FIG. 14E, the connectors (1472) are shown from a rear perspective view. The four connectors (1472) are individually fitted into the connector adapter (1478), which may be one of the connector adapters (1405) from FIG. 14A. The fibers from the different connectors (1472) are not grouped together and may be protected by the individual strain reliefs (1480) for each of the connectors (1472). The connectors (1472) may be very small form factor (VSFF) connectors.

Figure 14F:
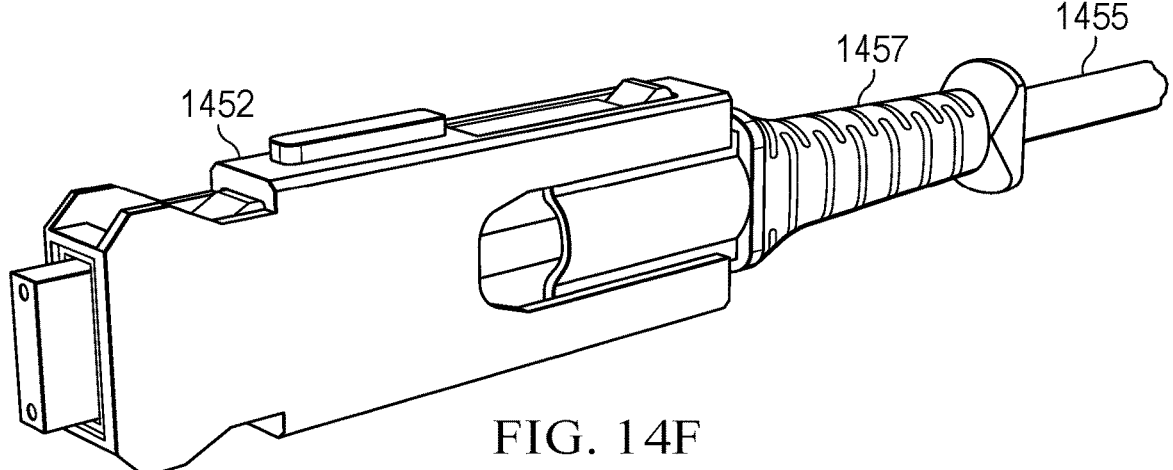

Turning to FIG. 14F, the connector (1452) is shown from a front perspective view. The fibers within the connector (1452) are grouped together into the cable (1455), which is protected by the strain relief (1457). The connector (1452) may be fitted to an external side of the connector adapters (1405) of FIG. 14A or to an internal side (i.e., within the module (1402) of FIG. 14A) of the connector adapters (1405) of FIG. 14A.

Figure 15A:
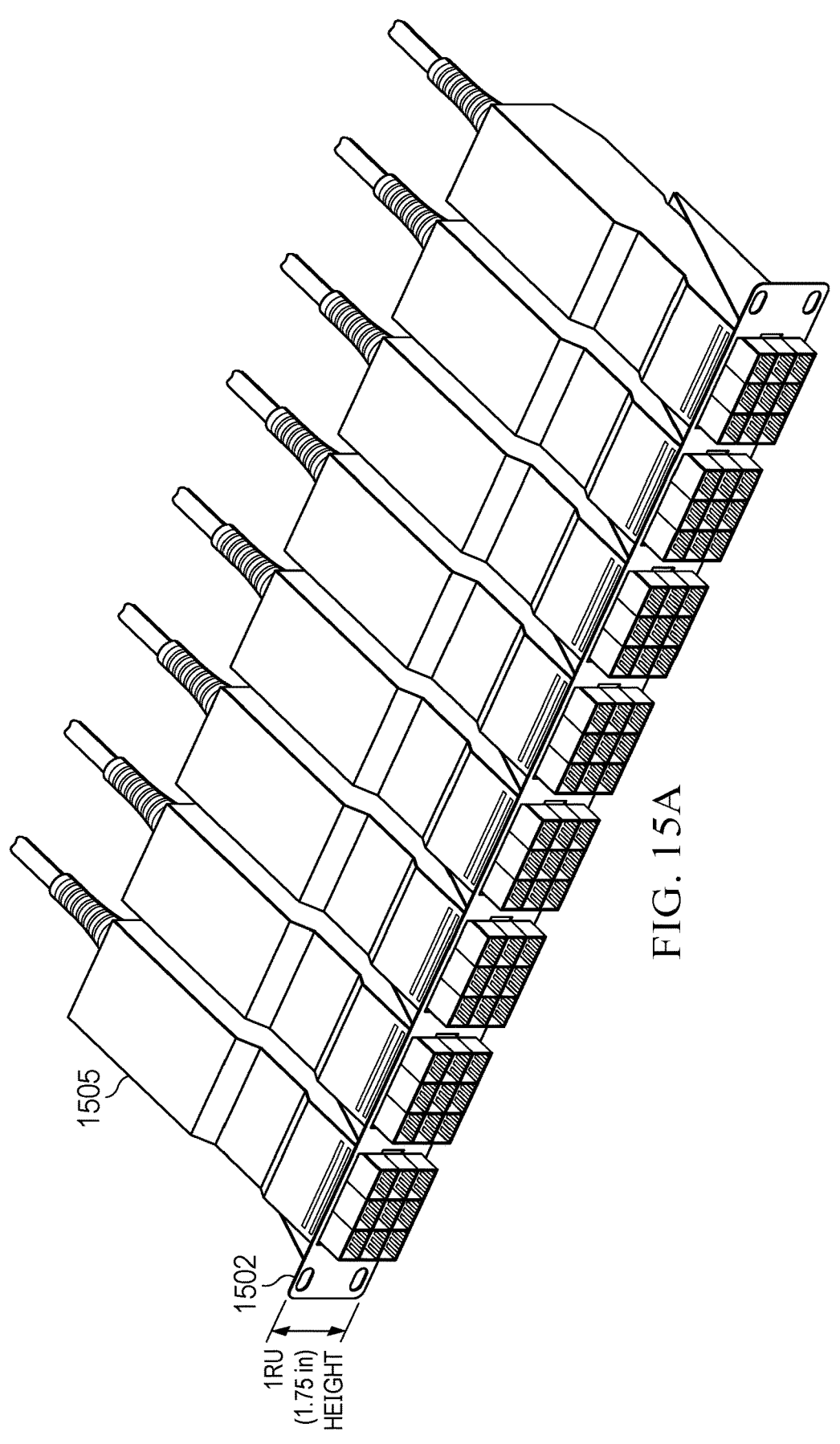

Turning to FIG. 15A, a front perspective view of the panel (1502) is illustrated. The panel (1502) includes space for eight of the modules (1505). The panel (1502) and the modules (1505) are sized to fit within a 1 U space (1.75 inches) of a 19 inch rack. With two fibers per port, thirty six ports per module, and eight modules per panel, the panel (1502) supports five hundred seventy six ("576") fibers per panel. With sixteen fibers per port, the panel (1502) supports four thousand six hundred eight ("4608") fibers per panel. With thirty two fibers per port, the panel (1502) supports nine thousand two hundred sixteen ("9216") fibers per panel.

Figure 15B:
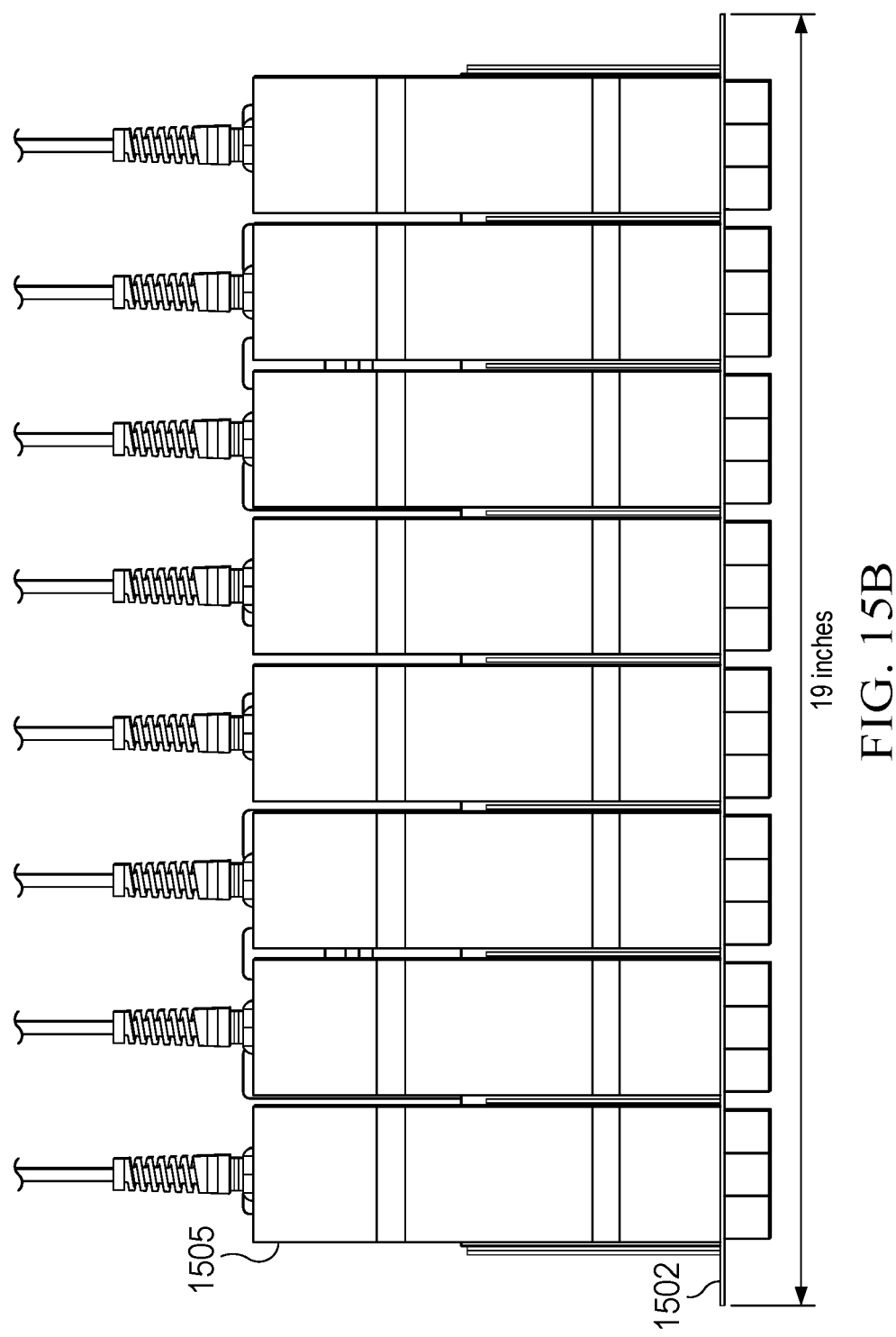

Turning to FIG. 15B, a top view of the panel (1502) is illustrated. The width of the panel (1502) is 19 inches with a usable space for the modules (1505) of 17.75 inches. The panel (1502) includes guides and channels for each of the modules (1505) to allow the modules (1505) to slide into place within the panel (1502).

Figure 16A:
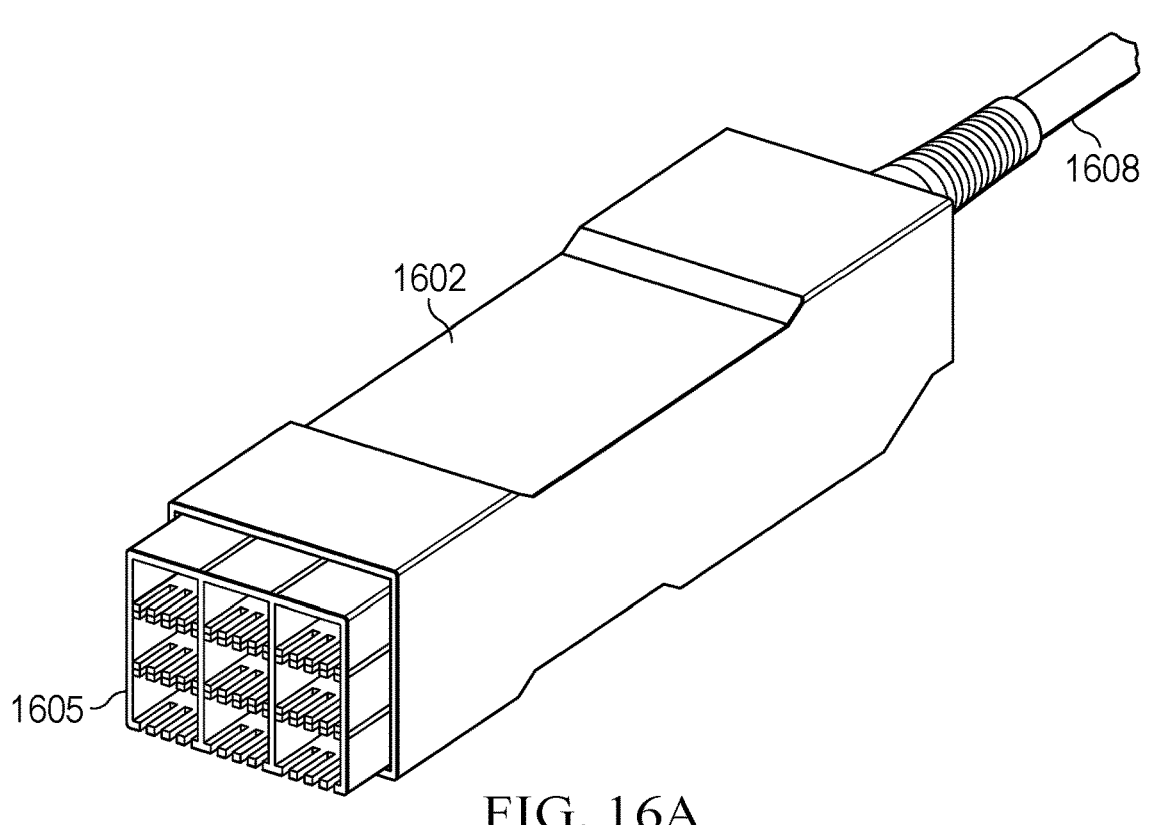

Turning to FIG. 16A, the module (1602) includes the connector adapters (1605) at a front end of the module (1602) with the strain relief (1608) at a rear or trunk end of the module (1602). The module (1602) includes a housing with a bottom half In one embodiment, the connector adapters (1605) may each accept four connectors on a front side and on a rear side (i.e., within the module (1602)) of the connector adapters (1605).

Figure 16B:
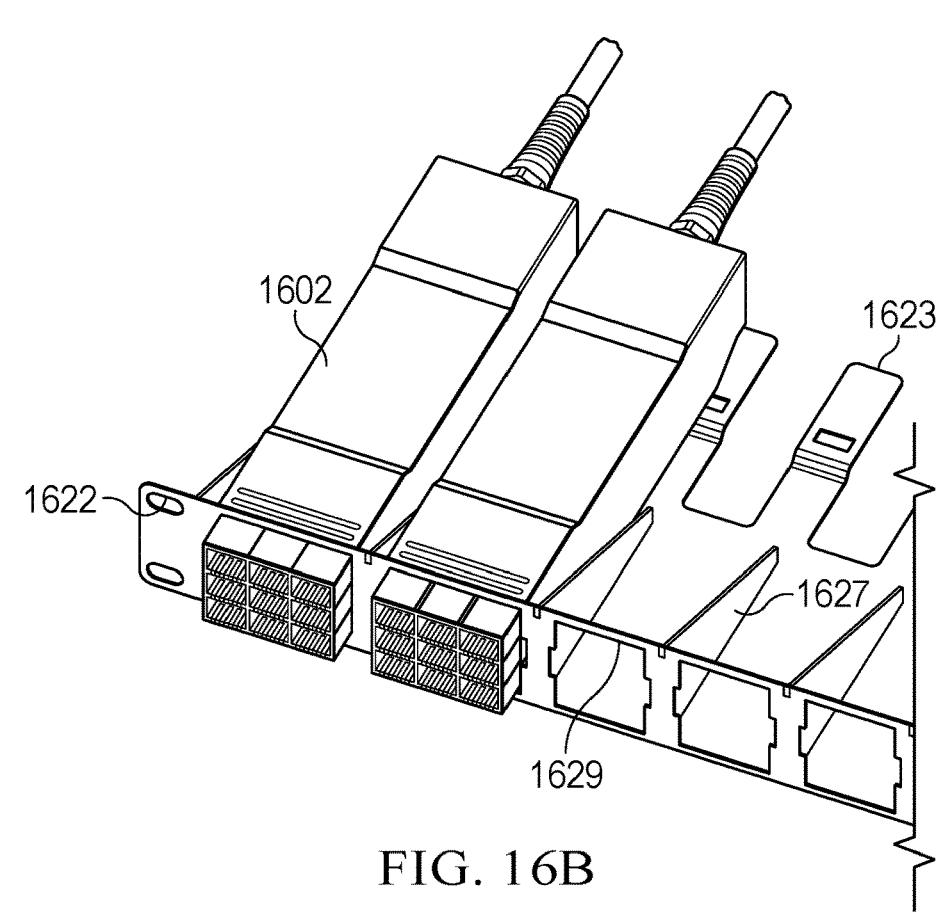

Turning to FIG. 16B, the module (1602) is one of multiple modules in the panel (1622) in a rack. The module (1602) includes connector adapters filed with connectors of external cables. Each slot in the panel (1622) for one of the modules includes the tab (1623) shaped to snap fit to the bottom of the module (1602). The panel (1622) includes the walls (1627) to separate the modules (1602). The panel includes the front plate (1629) to secure, align, and space the front ends of the modules (1602).

Figure 16C:
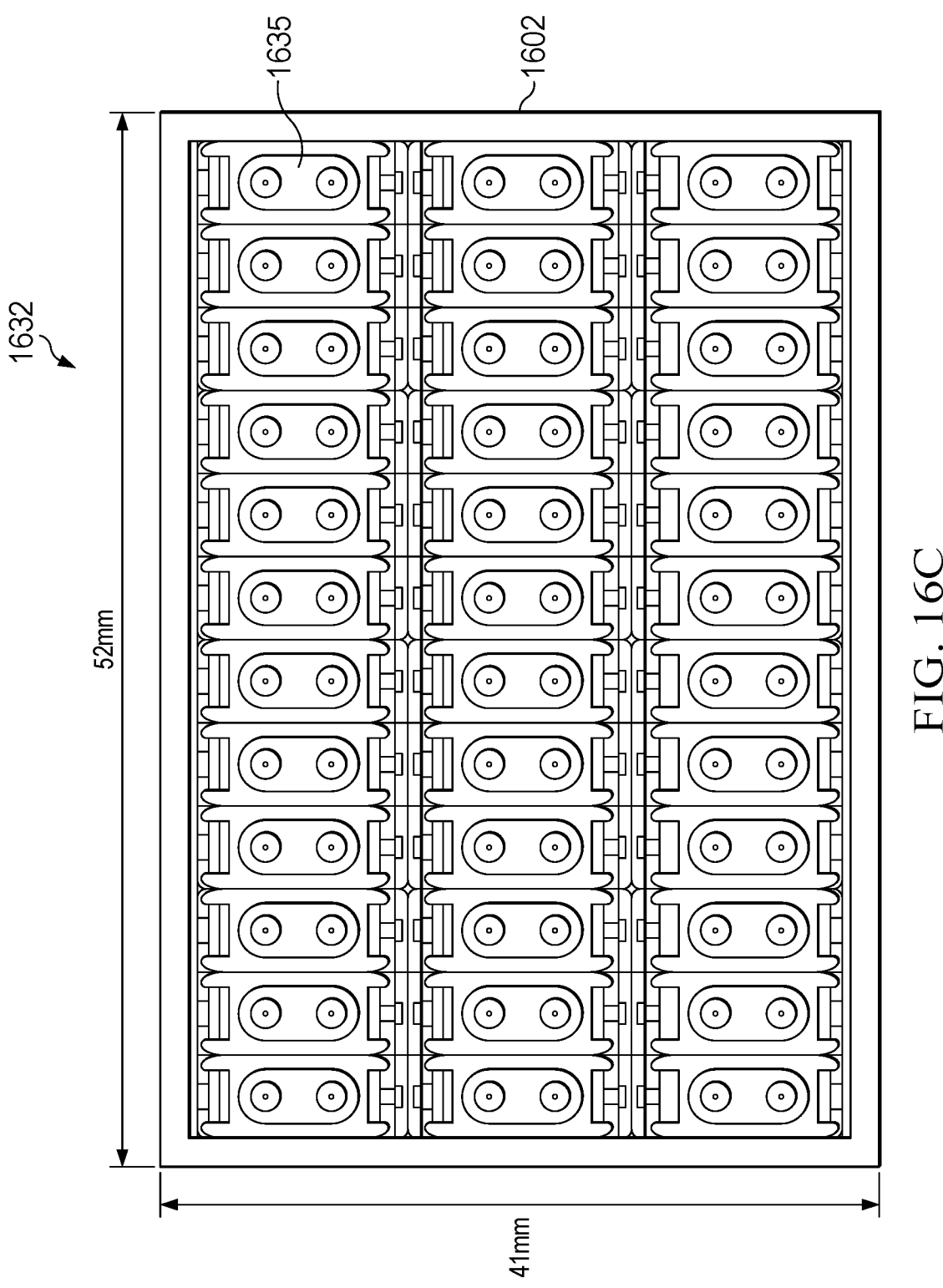

Turning to FIG. 16C, the front end (1632) of the module (1602) is illustrated. In one embodiment, the module (1602) includes thirty six ports (including the port (1635)) configured for two fibers per port. In one embodiment, each row may support twelve ports (with two fibers per port). In one embodiment, the module (1602) supports at least seventy two fibers. In one embodiment, a panel with eight modules supports at least five hundred seventy six fibers. In one embodiment, the height of the module (1602) is 41 millimeters with a tolerance of ±0.03 inches (or ±0.76 millimeters). Different heights of the module may be used, in conjunction with a panel, to fill the 1.75 inch (44.45 millimeters) height available in 1 U of a rack. In one embodiment, the width of the module (1602) is 52 millimeters with a tolerance of ±0.03 inches (or ±0.76 millimeters). With a height of 41 millimeters and a width of 52 millimeters, the aspect ratio of the module (1602) is greater than 0.788, which is greater than 0.7. and is less than 1. Different widths of the module may be used. The width of the module (1602) may be determined from the width of the connectors multiplied by the number of connectors in a row plus an offset amount for the width of the walls of the housing of the module (1602).

Figure 16D:
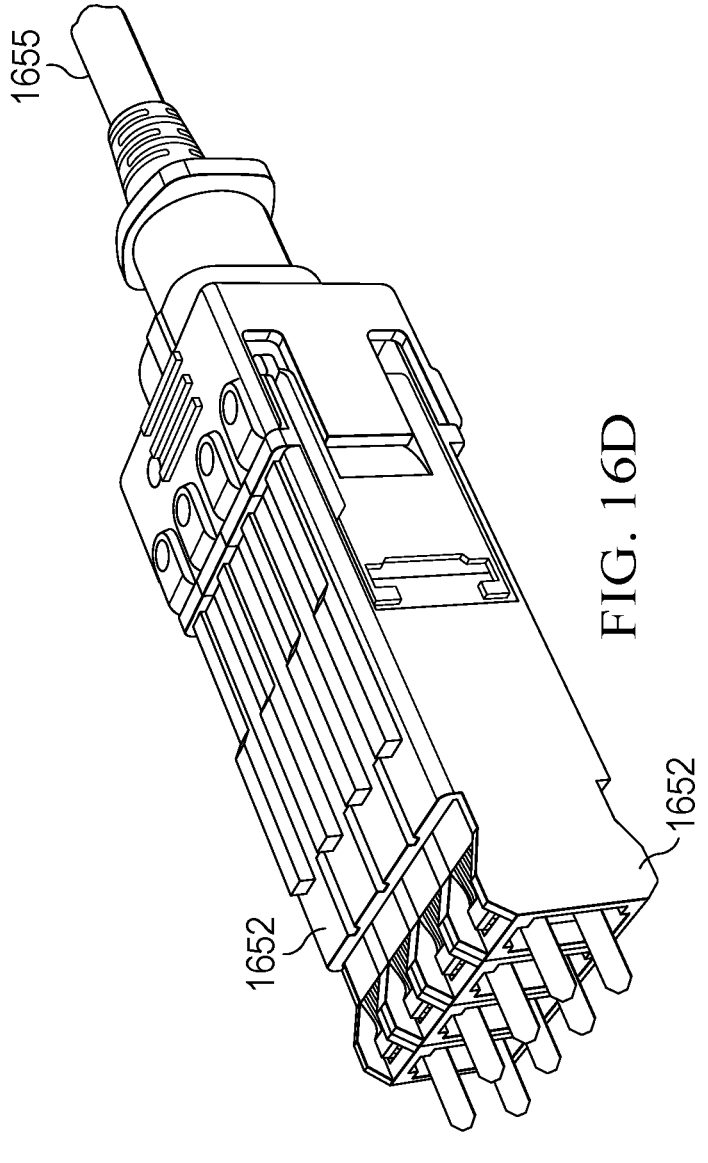

Turning to FIG. 16D, the connectors (1652) are shown from a front perspective view. The four connectors (1652) are clustered together. The fibers within the connectors (1652) are grouped together into the cable (1655). The connectors (1652) may be fitted to an external side of the connector adapters (1605) of FIG. 16A or to an internal side (i.e., within the module (1602) of FIG. 16A) of the connector adapters (1605) of FIG. 16A.

Figure 16E:
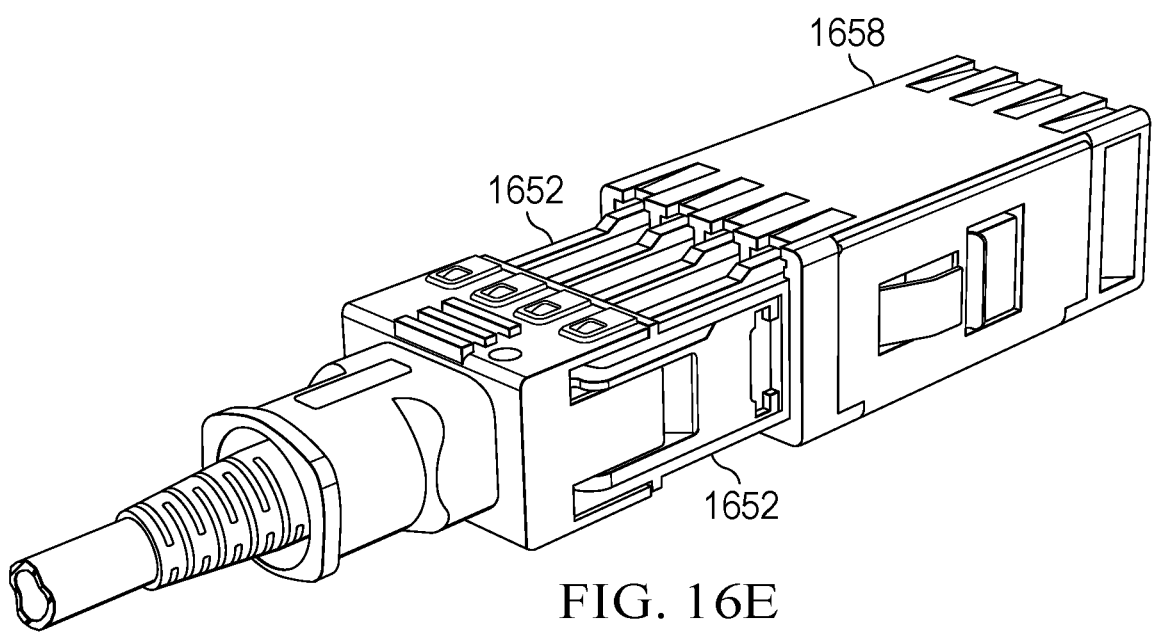

Turning to FIG. 16E, the connectors (1652) are shown from a rear perspective view. The four connectors (1652) are fitted into the connector adapter (1658), which may be one of the connector adapters (1605) from FIG. 16A.

Figure 16F:
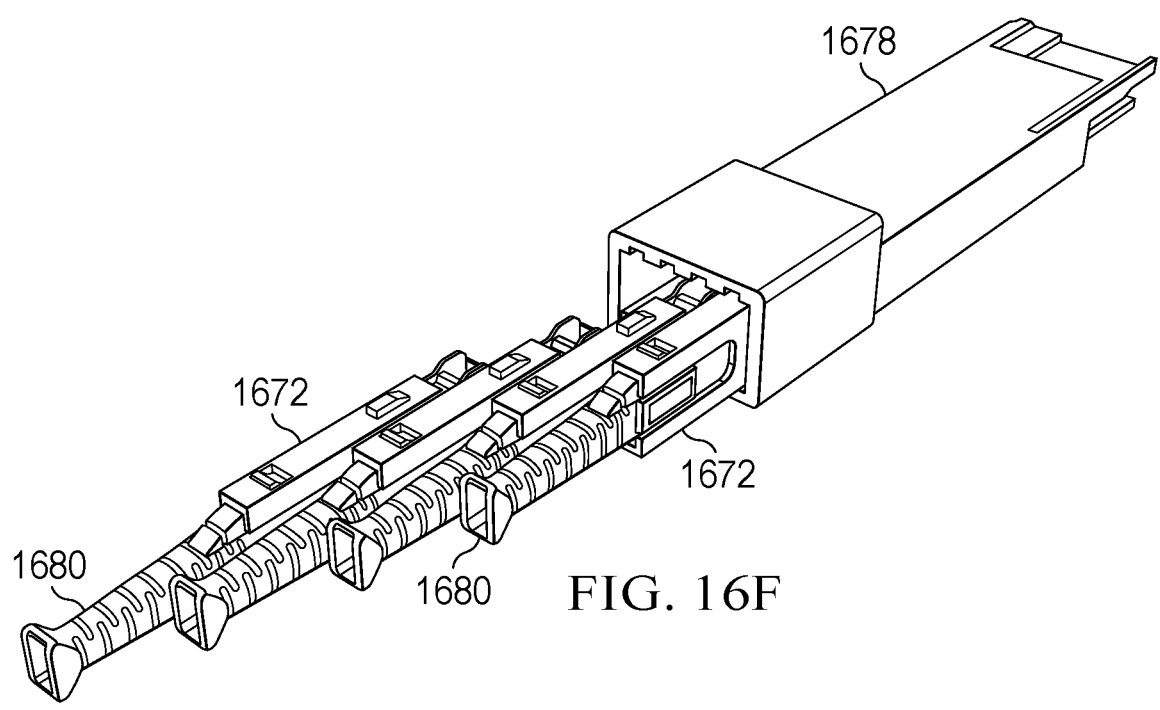

Turning to FIG. 16F, the connectors (1672) are shown from a rear perspective view. The four connectors (1672) are individually fitted into the connector adapter (1678), which may be one of the connector adapters (1605) from FIG. 16A. The fibers from the different connectors (1672) are not grouped together and may be protected by the individual strain reliefs (1680) for each of the connectors (1672). The connectors (1672) may be very small form factor (VSFF) connectors.

Figure 17A:
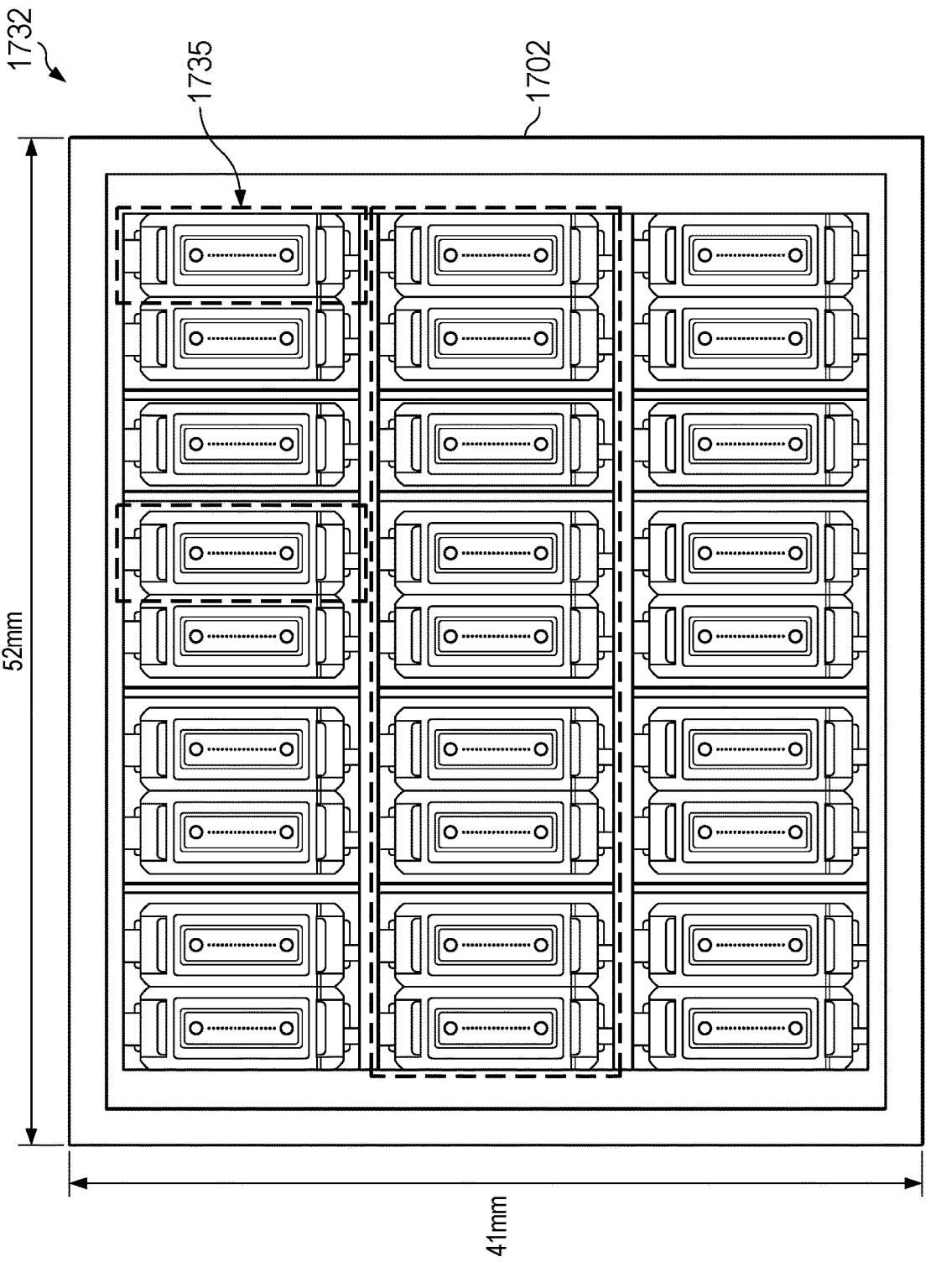

Turning to FIG. 17A, the front end (1732) of the module (1702) is illustrated. In one embodiment, the module (1702) includes twenty seven ports (including the port (1735)) configured for sixteen fibers per port. In one embodiment, each row may support nine ports (with sixteen fibers per port). In one embodiment, the module (1702) supports at least four hundred thirty two fibers. In one embodiment, a panel with eight modules supports at least three thousand four hundred fifty six fibers. In one embodiment, the height of the module (1702) is 41 millimeters with a tolerance of ±0.03 inches (or ±0.76 millimeters). Different heights of the module may be used, in conjunction with a panel, to fill the 1.75 inch (44.45 millimeters) height available in 1 U of a rack. In one embodiment, the width of the module (1702) is 52 millimeters with a tolerance of ±0.03 inches (or ±0.76 millimeters). With a height of 41 millimeters and a width of 52 millimeters, the aspect ratio of the module (1702) is greater than 0.788, which is greater than 0.7. and is less than 1. Different widths of the module may be used. The width of the module (1702) may be determined from the width of the connectors multiplied by the number of connectors in a row plus an offset amount for the width of the walls of the housing of the module (1702).

Figure 17B:
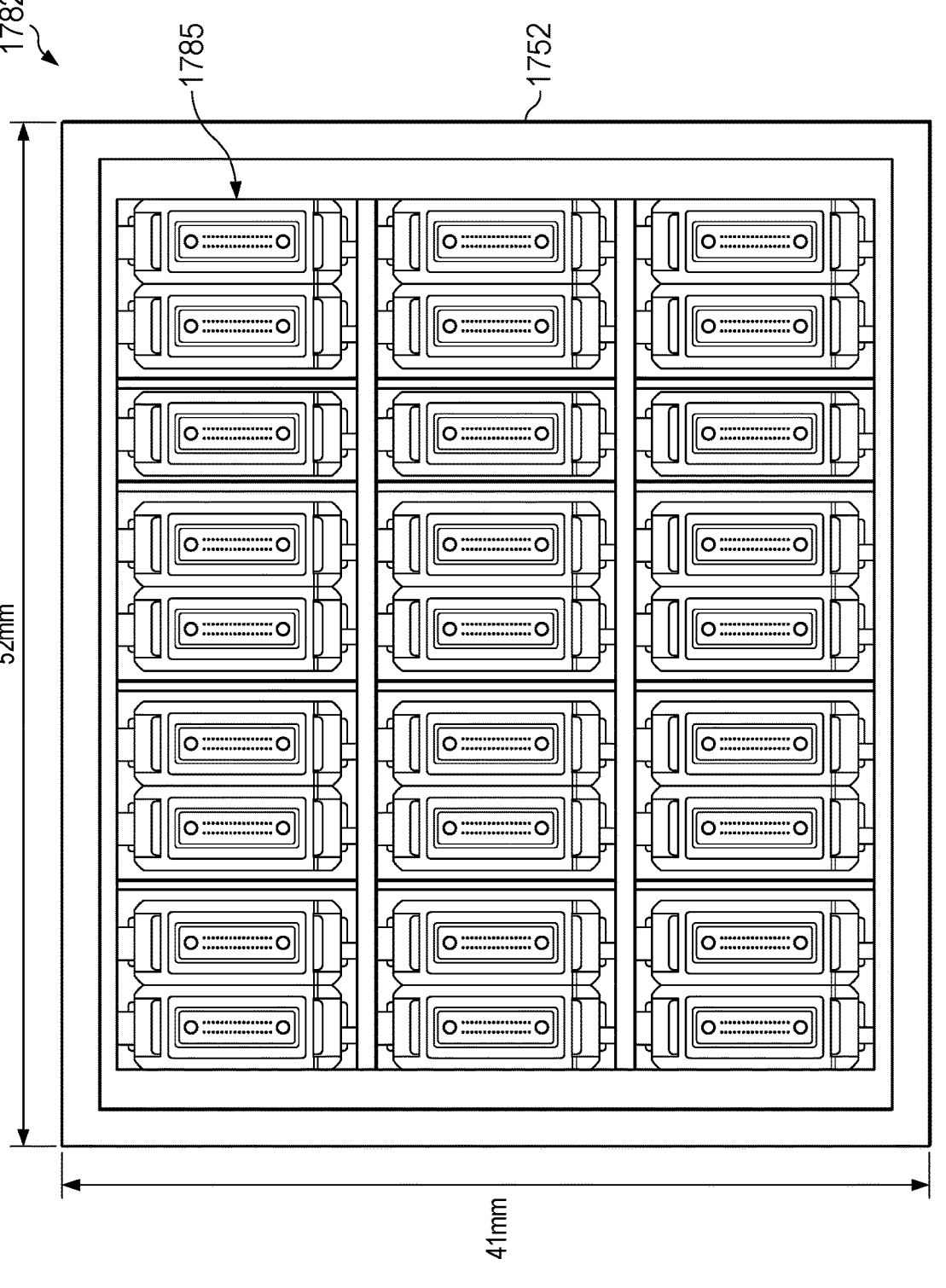

Turning to FIG. 17B, the front end (1782) of the module (1752) is illustrated. In one embodiment, the module (1752) includes twenty seven ports (including the port (1785)) configured for thirty two fibers per port. In one embodiment, each row may support nine ports (with thirty two fibers per port). In one embodiment, the module (1752) supports at least eight hundred sixty four fibers. In one embodiment, a panel with eight modules supports at least six thousand nine hundred twelve fibers. In one embodiment, the height of the module (1752) is 41 millimeters with a tolerance of ±0.03 inches (or ±0.76 millimeters). Different heights of the module may be used, in conjunction with a panel, to fill the 1.75 inch (44.45 millimeters) height available in 1 U of a rack. In one embodiment, the width of the module (1752) is 52 millimeters with a tolerance of ±0.03 inches (or ±0.76 millimeters). With a height of 41 millimeters and a width of 52 millimeters, the aspect ratio of the module (1752) is greater than 0.788, which is greater than 0.7. and is less than 1. Different widths of the module may be used. The width of the module (1752) may be determined from the width of the connectors multiplied by the number of connectors in a row plus an offset amount for the width of the walls of the housing of the module (1752).

The various descriptions, features, and elements of the figures may be combined and may include or be included within the features described in the other figures of the application Similarly named features and elements between different figures may refer to the same feature or element.

The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the word "or" is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. An apparatus comprising:
a module configured to be secured to a panel of a 1 U rack, the module including a front end; structured with:
a height corresponding to a height of a 1 U rack; and
an aspect ratio of the front end greater than 0.7, wherein the aspect ratio is identified by the height of the front end divided by a width of the front end, the module comprising:
a module housing;
a bezel frame secured by a set of retaining grooves within the module housing of the module,
a plurality of connector adapters secured with the bezel frame;
a plurality of connectors attached to the plurality of connector adapters, wherein the plurality of connectors include a first set of connectors and a second set of connectors; and
a plurality of optical fibers routed within the module housing of the module to the plurality of connectors, wherein optical fibers from the first set of connectors are not grouped together and optical fibers from the second set of connectors are grouped together.

2. The apparatus of claim 1, further comprising:
a plurality of ports corresponding to the plurality of connector adapters connected to the plurality of connectors at the front end of the module.

3. The apparatus of claim 1, wherein the width of the front end of the module is less than the height of the module.

4. The apparatus of claim 1, wherein:
the plurality of connectors includes at least three rows of connectors disposed within the front end of the module; and each of the at least three rows includes at least six connectors within the front end of the module.

5. The apparatus of claim 1, wherein:
the module includes a plurality of modules horizontally placed within the panel, and wherein the plurality of modules comprises at least ten modules.

6. The apparatus of claim 1, wherein:
a connector of the plurality of connectors has a height at the front end within the module,
the height of the connector is greater than a width of the connector, and
the height of the connector is aligned to the height of the front end of the module.

7. The apparatus of claim 1, wherein the module is further configured to secure one of at least thirty six, at least forty eight, at least two hundred eighty eight, and at least five hundred seventy six fibers.

8. The apparatus of claim 1, wherein:
the panel is further configured to secure one of at least four hundred thirty two fibers with twelve modules, at least four hundred eighty fibers with ten modules, at least three thousand four hundred sixty five fibers with twelve modules, and at least six thousand nine hundred twelve fibers with twelve modules.

9. The apparatus of claim 1, further comprising:
a port of the module comprising a connector securing one of two, sixteen, twenty four, and thirty two fibers.

10. The apparatus of claim 1, wherein:
the plurality of connectors includes a plurality of rows of connectors, and
a number of rows is half a number of ports per row.

11. The apparatus of claim 1, further comprising:
a trunk cable;
a breakout of the plurality of optical fibers from the trunk cable;
a heat shrink tube covering a portion of the trunk cable and a portion of the breakout.

12. A system comprising:
a panel configured to be secured to a 1 U rack; and
a module configured to be secured to the panel, the module including: a front end structured with:
a height corresponding to a height of a 1 U rack; and
an aspect ratio of the front end greater than 0.7, wherein the aspect ratio is identified by the height of the front end divided by a width of the front end, the module comprising:
a module housing;
a bezel frame secured by a set of retaining grooves within the module housing of the module,
a plurality of connector adapters secured with the bezel frame;
a plurality of connectors attached to the plurality of connector adapters, wherein the plurality of connectors include a first set of connectors and a second set of connectors; and
a plurality of optical fibers routed within the module housing of the module to the plurality of connectors, wherein optical fibers from the first set of connectors are not grouped together and optical fibers from the second set of connectors are grouped together.

13. The system of claim 12, further comprising:
a plurality of ports corresponding to the plurality of connector adapters connected to the plurality of connectors at the front end of the module.

14. The system of claim 12, wherein the width of the front end of the module is less than the height of the module.

15. The system of claim 12, wherein:

the plurality of connectors includes at least three rows of connectors disposed within the front end of the module;

each of the at least three rows includes at least six connectors within the front end of the module;

the module includes a plurality of modules horizontally placed within the panel, and the plurality of modules comprises at least ten modules.

16. The system of claim 12, wherein:

a connector of the plurality of connectors has a height at the front end within the module, the height of the connector is greater than a width of the connector, the height of the connector is aligned to the height of the front end of the module; and the module is further configured to secure one of at least thirty six, at least forty eight, at least two hundred eighty eight, and at least five hundred seventy six fibers.

17. The system of claim 12, wherein:

the panel is further configured to secure one of at least four hundred thirty two fibers with twelve modules, at least four hundred eighty fibers with ten modules, at least three thousand four hundred sixty five fibers with twelve modules, and at least six thousand nine hundred twelve fibers with twelve modules.

18. The system of claim 12, further comprising:

a port of the module comprising a connector securing one of two, sixteen, twenty four, and thirty two fibers.

19. The system of claim 12, wherein:

the plurality of connectors includes a plurality of rows of connectors, and a number of rows is half a number of ports per row, a trunk cable;

a breakout of the plurality of optical fibers from the trunk cable; and a heat shrink tube covering a portion of the trunk cable and a portion of the breakout.

20. A method, comprising:

securing a module to a panel of a 1 U rack, wherein the module including a front end structured with:

a height corresponding to a height of a 1 U rack; and an aspect ratio of the front end greater than 0.7, wherein the aspect ratio is identified by the height of the front end divided by a width of the front end, the module comprising:

a module housing;

a bezel frame secured by a set of retaining grooves within the module housing of the module, a plurality of connector adapters secured with the bezel frame;

a plurality of connectors attached to the plurality of connector adapters, wherein the plurality of connectors include a first set of connectors and a second set of connectors; and a plurality of optical fibers routed within the module housing of the module to the plurality of connectors, wherein optical fibers from the first set of connectors are not grouped together and optical fibers from the second set of connectors are grouped together; and securing the panel to the 1 U rack.

* * * * *